United States Patent
Kawashima et al.

(10) Patent No.: US 8,768,578 B2
(45) Date of Patent: Jul. 1, 2014

(54) HYBRID EXCAVATOR AND METHOD OF CONTROLLING HYBRID EXCAVATOR

(75) Inventors: Koji Kawashima, Kanagawa (JP); Yuta Sugiyama, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 131 days.

(21) Appl. No.: 13/376,932

(22) PCT Filed: Jun. 8, 2010

(86) PCT No.: PCT/JP2010/059696
§ 371 (c)(1),
(2), (4) Date: Dec. 8, 2011

(87) PCT Pub. No.: WO2010/143628
PCT Pub. Date: Dec. 16, 2010

(65) Prior Publication Data
US 2012/0082536 A1  Apr. 5, 2012

(30) Foreign Application Priority Data
Jun. 9, 2009  (JP) ................. 2009-137970

(51) Int. Cl.
*E02F 3/43* (2006.01)
*E02F 3/30* (2006.01)
*E02F 9/20* (2006.01)

(52) U.S. Cl.
USPC ............. 701/50; 701/22; 701/903; 701/36; 180/65.265; 180/65.285; 414/694

(58) Field of Classification Search
None
See application file for complete search history.

(56) References Cited

U.S. PATENT DOCUMENTS

| 5,941,328 | A  | * | 8/1999  | Lyons et al. ............... 180/65.1 |
| 6,635,973 | B1 | * | 10/2003 | Kagoshima et al. ......... 307/10.1 |
| 6,701,229 | B2 | * | 3/2004  | Iwasaki ..................... 701/22 |
| 6,727,670 | B1 | * | 4/2004  | Grabowski et al. ......... 318/432 |
| 6,966,803 | B2 | * | 11/2005 | Hara et al. ................. 440/6 |

(Continued)

FOREIGN PATENT DOCUMENTS

EP  1 126 085 A1  8/2001
JP  2002-359935  12/2002

(Continued)

OTHER PUBLICATIONS

International Search Report mailed on Sep. 21, 2010.

(Continued)

*Primary Examiner* — Helal A Algahaim
*Assistant Examiner* — Genna Mott
(74) *Attorney, Agent, or Firm* — Ipusa, PLLC

(57) ABSTRACT

A motor generator control unit controls operation of a motor generator which generates power using a driving force transmitted from an engine. A charge/discharge control unit electrically connects first and second electrical power storage devices and controls charging/discharging of power between the first and second electrical power storage devices in response to an externally supplied control signal. A motor which is electrically connected to the second electrical power storage device is capable of regenerating electric energy and storing the regenerated energy in the second electrical power storage device. A control device supplies a control signal to at least one of the motor generator control unit and the charge/discharge control unit and reduces an electrical power storage target value of at least one of the first and second electrical power storage devices before the motor regenerates energy.

12 Claims, 15 Drawing Sheets

(56) References Cited

U.S. PATENT DOCUMENTS

| | | | |
|---|---|---|---|
| 7,388,301 B2 * | 6/2008 | Komiyama et al. | 290/40 C |
| 2004/0210356 A1 * | 10/2004 | Wilton et al. | 701/22 |
| 2009/0024265 A1 * | 1/2009 | Kortschak et al. | 701/22 |

FOREIGN PATENT DOCUMENTS

| | | |
|---|---|---|
| JP | 2004-201411 | 7/2004 |
| JP | 2007-59810 | 3/2007 |
| JP | 2007-155586 A | 6/2007 |
| JP | 2007-218003 | 8/2007 |
| JP | 2008-38503 | 2/2008 |
| WO | WO2010/087363 A1 | 8/2010 |

OTHER PUBLICATIONS

Extended European Search Report dated May 7, 2012.

* cited by examiner

HYBRID EXCAVATOR AND METHOD OF CONTROLLING HYBRID EXCAVATOR

TECHNICAL FIELD

The present disclosure generally relates to a hybrid excavator, and more particularly to a hybrid excavator in which an electrical power storage device is charged by regeneration power from an electric load.

BACKGROUND ART

Generally, a hybrid excavator includes an upper turning body which carries work elements, such as a boom, an arm, and a bucket. The hybrid excavator drives the boom and the arm while turning the upper turning body so that the bucket is moved to a desired work position.

A hybrid excavator which uses an electric motor as a source of power of a turning mechanism to turn the upper turning body is proposed (for example, refer to Patent Document 1 listed below). When decelerating the upper turning body, the electric motor is operated as a dynamo to generate electric power and the regeneration power is stored in an electrical power storage device.

RELATED ART DOCUMENT

Patent Document

Patent Document 1: Japanese Laid-Open Patent Publication No. 2007-218003

DISCLOSURE OF THE INVENTION

Problem to be Solved by the Invention

If large regeneration power occurs in a hybrid excavator and the regeneration power is supplied to the electrical power storage device, there is a possibility that an overvoltage exceeding an upper limit of the electrical power storage device takes place and the electrical power storage device is in an overcharge state. If the electrical power storage device is in an overcharge state, the electrical power storage device is continuously subjected to the overvoltage, which will promote degradation of the electrical power storage device. Therefore, the life of the electrical power storage device becomes short.

Accordingly, in one aspect, the present disclosure provides a hybrid excavator which is capable of adjusting at least one of an electrical power storage target value of an electrical power storage device and an electrical power storage target value of a DC bus variably and capable of preventing overcharging of the electrical power storage device even if large regeneration power occurs.

Means for Solving the Problem

In an embodiment which solves or reduces one or more of the above-mentioned problems, the present disclosure provides a hybrid excavator including a lower running body, an upper turning body which is turned on the lower running body, a boom having an end rotatably attached to the upper turning body, an arm having an end rotatably attached to the other end of the boom, and a work element rotatably attached to the other end of the arm, the hybrid excavator including: an engine disposed in the upper turning body to generate a driving force; a motor generator disposed in the upper turning body to perform a power generating operation by the driving force transmitted from the engine; a motor generator control unit disposed in the upper turning body to control and the electric power generating operation of the motor generator in response to a control signal supplied from a control device; a first electrical power storage device disposed in the upper turning body and being capable of storing electricity; a second electrical power storage device disposed in the upper turning body, electrically connected to the motor generator control unit and being capable of storing electricity; a charge/discharge control unit disposed in the upper turning body to electrically connect the first electrical power storage device and the second electrical power storage device together and controlling a charge/discharge operation between the first electrical power storage device and the second electrical power storage device in response to an externally supplied control signal; a motor disposed in the upper turning body and electrically connected to the second electrical power storage device, the motor being capable of performing a regeneration operation to generate electric energy from mechanical energy and capable of storing the electric energy generated by the regeneration operation in the second electrical power storage device; and the control device disposed in the upper turning body to supply a control signal to at least one of the motor generator control unit and the charge/discharge control unit, wherein the control device is arranged to reduce an electrical power storage target value of at least one of the first electrical power storage device and the second electrical power storage device before the regeneration operation is performed by the motor.

In an embodiment which solves or reduces one or more of the above-mentioned problems, the present disclosure provides a method of controlling a hybrid excavator including: an engine to generate a driving force; a motor generator to perform an electric power generating operation by the driving force transmitted from the engine; a motor generator control unit to control operation of the motor generator in response to an externally supplied control signal; a first electrical power storage device capable of storing electricity; a second electrical power storage device electrically connected to the motor generator control unit and being capable of storing electricity; a charge/discharge control unit electrically connecting the first electrical power storage device and the second electrical power storage device together and controlling a charge/discharge operation between the first electrical power storage device and the second electrical power storage device in response to an externally supplied control signal; a motor electrically connected to the second electrical power storage device, the motor being capable of performing a regeneration operation to generate electric energy from mechanical energy and capable of storing the electric energy generated by the regeneration operation in the second electrical power storage device; and a control device to supply a control signal to at least one of the motor generator control unit and the charge/discharge control unit, the method of controlling the hybrid excavator including: reducing an electrical power storage target value of at least one of the first electrical power storage device and the second electrical power storage device before the regeneration operation is performed by the motor.

Effects of the Invention

According to the present disclosure, when occurrence of regeneration power is expected, the electrical power storage target value of the electrical power storage device is lowered and it is possible to prevent the overcharging of the electrical power storage device. By adjusting the electrical power storage target value of the electrical power storage device according to the operating state of the hybrid excavator, it is possible to prevent the overcharging of the electrical power storage device.

BEST MODE FOR CARRYING OUT THE INVENTION

A description will now be given of embodiments of the present disclosure with reference to the accompanying drawings.

Hereinafter, a target charging value designates an amount to which an electrical storage device such as a capacitor is being charged.

Figure 1:
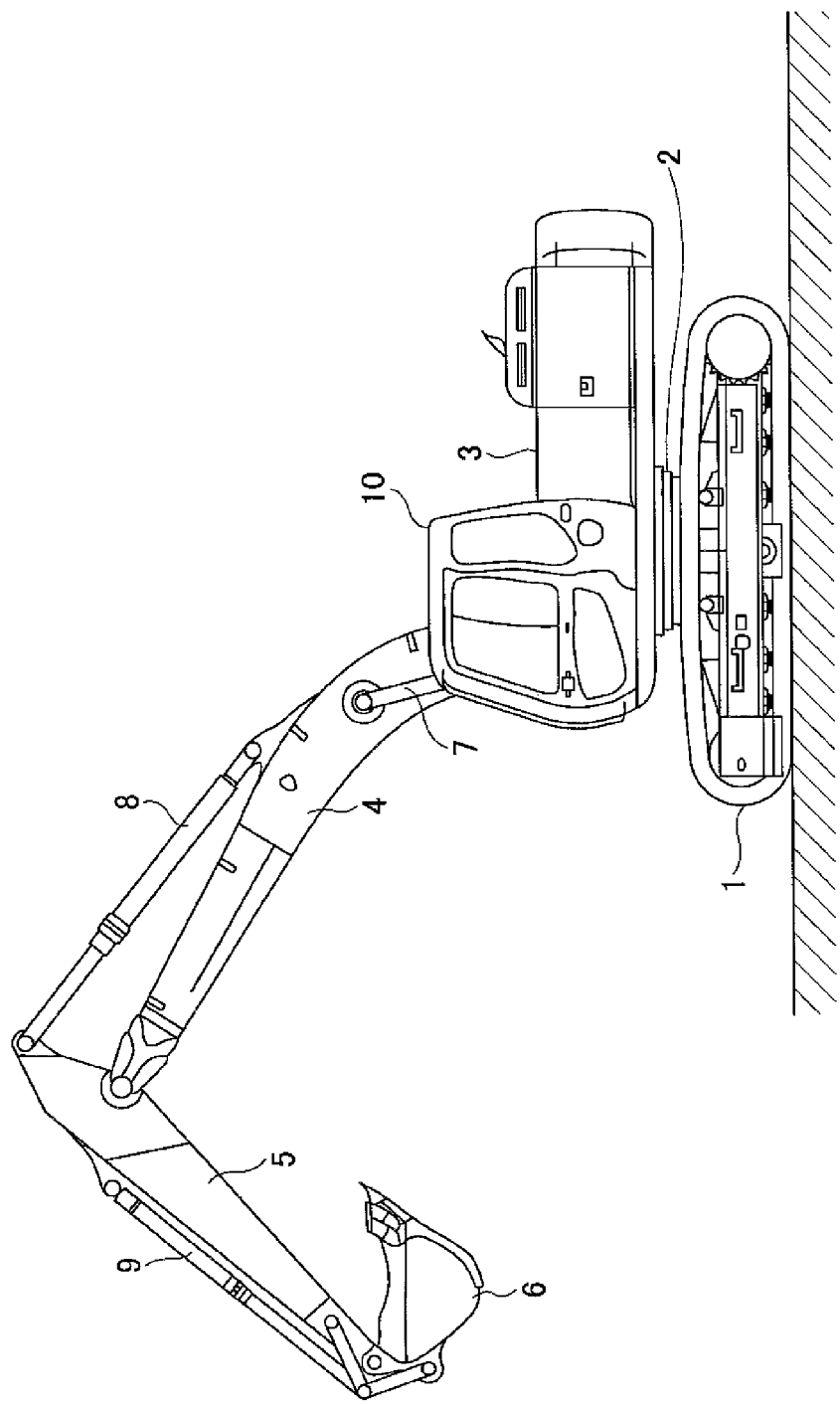
FIG. 1 is a side view of a hybrid excavator.

FIG. 1 is a side view of a hybrid excavator to which an embodiment of the present disclosure is applied.

A lower running body 1 of the hybrid excavator carries an upper turning body 3 through a turning mechanism 2. A boom 4 is attached to the upper turning body 3. An arm 5 is attached at the end of the boom 4. A bucket 6 is attached at the end of the arm 5. The boom 4, the arm 5, and the bucket 6 are hydraulically driven by a boom cylinder 7, an arm cylinder 8, and a bucket cylinder 9, respectively. A cabin 10 is arranged in the upper turning body 3, and the source of power, such as an engine, is carried in the upper turning body 3.

Figure 2:
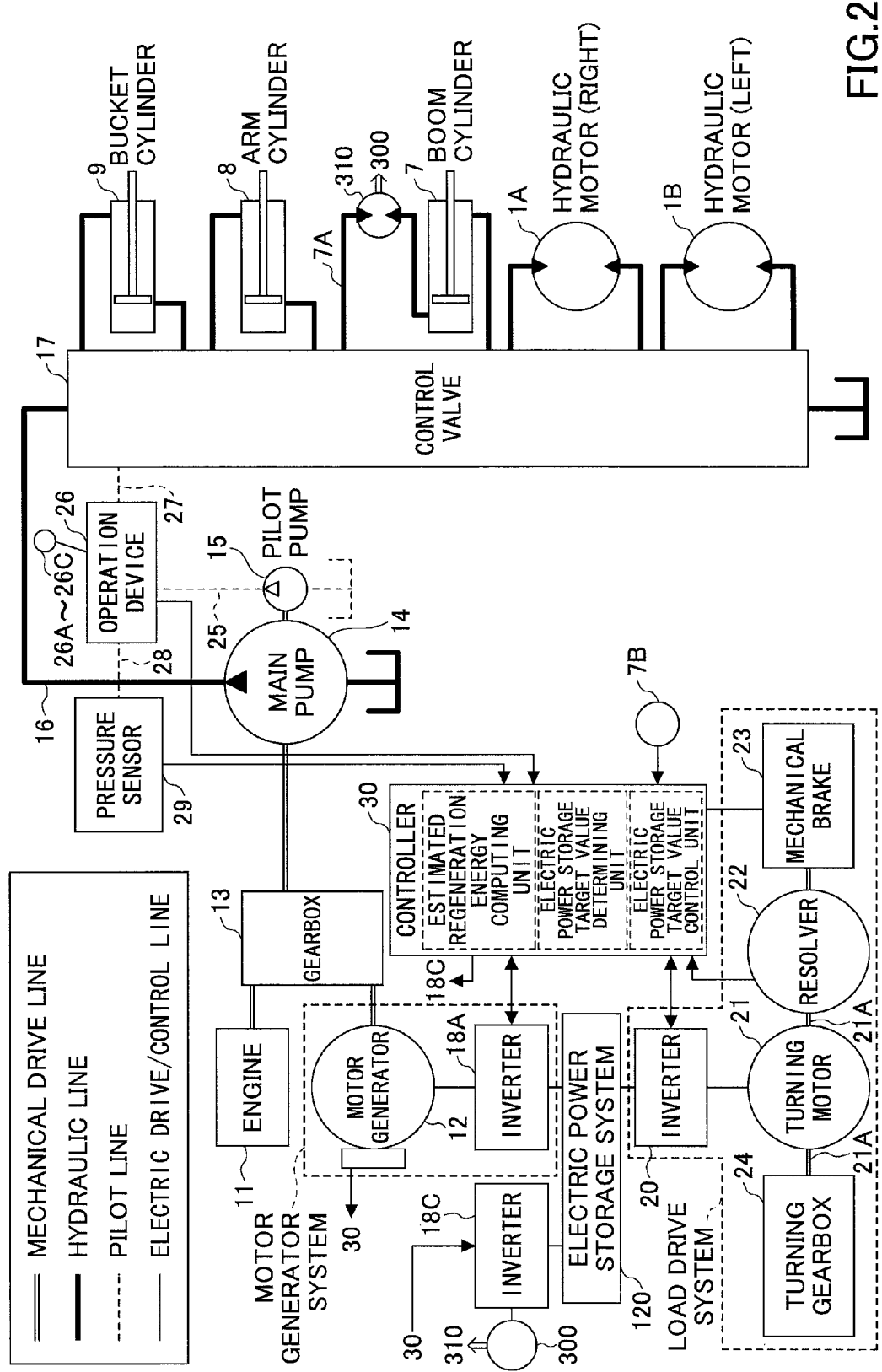
FIG. 2 is a block diagram showing the composition of a drive system of a hybrid excavator of a first embodiment of the present disclosure.

FIG. 2 is a block diagram showing the composition of a drive system of a hybrid excavator of a first embodiment of the present disclosure. In FIG. 2, the double line denotes a mechanical drive line, the thick solid line denotes a high pressure hydraulic line, the dotted line denotes a pilot line, and the thin solid line denotes an electric drive/control line, respectively.

An engine 11 as a mechanical drive part and a motor generator 12 as an assist drive part are connected to two input axes of a gearbox 13, respectively. A main pump 14 as a hydraulic pump and a pilot pump 15 are connected to the output axis of the gearbox 13. A control valve 17 is connected to the main pump 14 via a high pressure hydraulic line 16.

The control valve 17 is a control unit which controls a hydraulic system of the hybrid excavator. A hydraulic motor 1A (for the right side use) and a hydraulic motor 1B (for the left side use) are provided for driving the lower running body 1. The hydraulic motors 1A and 1B, the boom cylinder 7, the arm cylinder 8, and the bucket cylinder 9 are connected to the control valve 17 via the high pressure hydraulic line.

An electrical power storage system 120 contains a capacitor as an electrical power storage device of the hybrid excavator and is connected to the motor generator 12 via an inverter 18A. A turning motor 21 as an electric work element is connected to the electrical power storage system 120 via an inverter 20. A resolver 22, a mechanical brake 23, and a turning gearbox 24 are connected to the axis of rotation 21A of the turning motor 21. An operation device 26 is connected to the pilot pump 15 via the pilot line 25. The turning motor 21, the inverter 20, the resolver 22, the mechanical brake 23, and the turning gearbox 24 constitute a load drive system.

The operation device 26 includes a lever 26A, a lever 26B, and a pedal 26C. The lever 26A, the lever 26B, and the pedal 26C are connected to each of the control valve 17 and a pressure sensor 29 via a pilot line 27 and a pilot line 28, respectively. The pressure sensor 29 is connected to a controller 30, and the controller 30 performs drive control of the electric system.

In this embodiment, a boom regeneration motor 300 (also called a dynamo 300) is provided for obtaining boom regeneration power and is connected to the electrical power storage system 120 via an inverter 18C. The boom regeneration motor 300 is driven by a hydraulic motor 310 which is driven by the hydraulic fluid discharged from the boom cylinder 7. The boom regeneration motor 300 converts the potential energy of the boom 4 into electrical energy by using the pressure of the hydraulic fluid discharged from the boom cylinder 7 when the boom 4 is lowered by gravity.

For the sake of convenience of description, in FIG. 2, the hydraulic motor 310 and the boom regeneration motor 300 are illustrated as being located in the positions that are separate from each other. In practical applications, however, the axis of rotation of the boom regeneration motor 300 is mechanically connected to the axis of rotation of the hydraulic motor 310.

Namely, the hydraulic motor 310 is arranged so that the hydraulic motor 310 is rotated by the hydraulic fluid which is discharged from the boom cylinder 7 when the boom 4 is lowered. The hydraulic motor 310 is provided to convert the energy generated when the boom 4 is lowered by gravity into a rotational force. The hydraulic motor 310 is arranged in a hydraulic piping 7A between the control valve 17 and the boom cylinder 7. The hydraulic motor 310 may be attached to a suitable location within the upper turning body 3.

The power generated by the boom regeneration motor 300 is supplied to the electrical power storage system 120 through the inverter 18C as regeneration power. The boom regeneration motor 300 and the inverter 18C constitute a load drive system.

In this embodiment, a boom angle sensor 7B is provided for detecting the angle of the boom 4 and attached to the supporting shaft of the boom 4. The boom angle sensor 7B supplies the detected boom angle θB to the controller 30.

Figure 3:
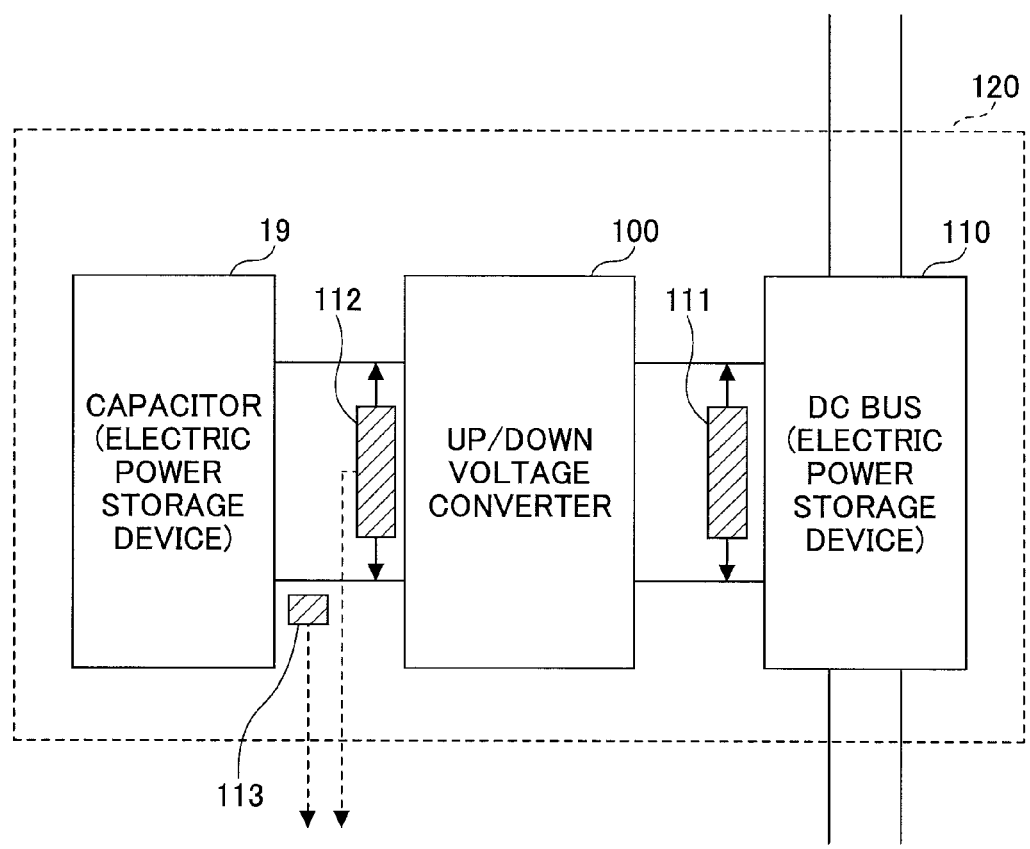
FIG. 3 is a block diagram showing the composition of an electrical power storage system.

FIG. 3 is a block diagram showing the composition of the electrical power storage system 120. The electrical power storage system 120 includes a capacitor 19 as an electrical power storage device of the hybrid excavator, and an up-down voltage converter 100 and a DC bus 110. The DC bus 110 is a second electrical power storage device of the hybrid excavator and controls transfer of the electric power between capacitor 19 as the first electrical power storage device of the hybrid excavator, the motor generator 12, and the turning motor 21.

In the capacitor 19, a capacitor voltage detecting part 112 for detecting a voltage value of the capacitor and a capacitor current detecting part 113 for detecting a current value of the capacitor are arranged. The capacitor voltage value and the capacitor current value which are detected by the capacitor voltage detecting part 112 and the capacitor current detecting part 113 are supplied to the controller 30.

The up-down voltage converter 100 controls switching of voltage raising operation and voltage lowering operation according to the operating state of the motor generator 12, the boom regeneration motor 300, and the turning motor 21 so that the DC bus voltage value falls within a fixed range. The DC bus 110 is arranged between the inverters 18A, 18C, and 20 and the up-down voltage converter 100, and delivers or receives the electric power between the capacitor 19, the motor generator 12, the boom regeneration motor 300, and the turning motor 21.

Referring back to FIG. 2, the controller 30 is a control unit as a main control part which performs drive control of the hybrid excavator. The controller 30 is constituted by a processor unit including a CPU (central processing unit) and an internal memory, and the functions of the controller 30 are performed by the CPU which executes a drive control program read from the internal memory.

The controller 30 converts the signal received from the pressure sensor 29 into a speed command, and performs drive control of the turning motor 21 by using the speed command. The signal received from the pressure sensor 29 is equivalent to the signal indicating the operational amount when the operation device 26 is operated in order to turn the turning mechanism 2.

The controller 30 controls operation of the motor generator 12 (switching of a motor-assisted operation and a power generating operation), and controls operation of the up-down voltage converter 100 as the voltage raising/lowering control unit in order to control charging/discharging of the capacitor 19. The controller 30 controls switching of the voltage raising operation and the voltage lowering operation of the up-down voltage converter 100 based on the charging state of the capacitor 19, the operating state of the motor generator 12 (motor-assisted operation or power generating operation) and the operating state (power operation or regeneration operation) of the turning motor 21, so that the charging/discharging of the capacitor 19 is controlled.

The switching control of the voltage raising operation and the voltage lowering operation of the up-down voltage converter 100 is carried out based on the DC bus voltage value detected by the DC bus voltage detecting part 111, the capacitor voltage value detected by the capacitor voltage detecting part 112, and the capacitor current value detected by the capacitor current detecting part 113.

In the above-described composition, the power generated by the motor generator 12 as an assist motor is supplied to the DC bus 110 of the electrical power storage system 120 via the inverter 18A, and supplied to the capacitor 19 via the up-down voltage converter 100. The regeneration power obtained by the regeneration operation of the turning motor 21 is supplied to the DC bus 110 of the electrical power storage system 120 via the inverter 20, and supplied to the capacitor 19 via the up-down voltage converter 100. The power generated by the boom regeneration motor 300 is supplied to the DC bus 110 of the electrical power storage system 120 via the inverter 18C, and supplied to the capacitor 19 via the up-down voltage converter 100.

The rotational speed (the angular velocity ω) of the turning motor 21 is detected by the resolver 22. The angle (the boom angle θB) of the boom 4 is detected by the boom angle sensor 7B, such as a rotary encoder, provided on the supporting shaft of the boom 4. The controller 30 computes an estimated turning regeneration power (energy) based on the angular velocity ω of the turning motor 21, and computes an estimated boom regeneration power (energy) based on the boom angle θB. Based on the estimated turning regeneration power and the estimated boom regeneration power which are thus computed, the controller 30 computes an estimated regeneration target value of SOC. The controller 30 controls the respective parts of the hybrid excavator to bring the SOC of the capacitor 19 close to the thus computed estimated regeneration target value.

Figure 4:
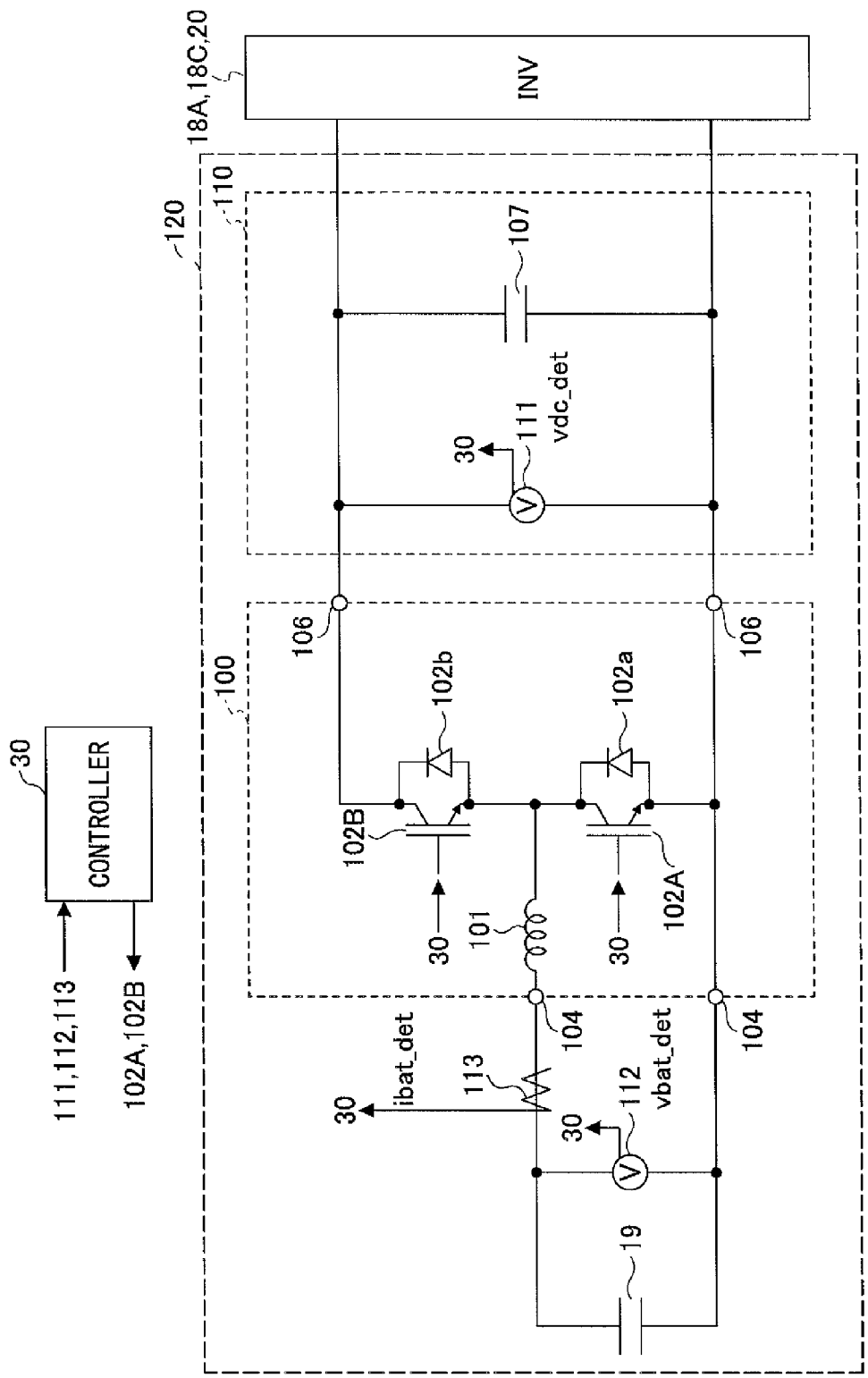
FIG. 4 is a circuit diagram of an electrical power storage system.

FIG. 4 is a circuit diagram of the electrical power storage system 120. The electrical power storage system 120 includes an up-down voltage converter 100, a reactor 101, a voltage raising IGBT (insulated gate bipolar transistor) 102A, a voltage lowering IGBT 102B, a pair of power supply connection terminals 104 for connecting the capacitor 19, a pair of output terminals 106 for connecting the DC bus 110, and a smoothing capacitor 107 connected in parallel to the output terminals 106. The DC bus 110 is connected between the output terminals 106 of the up-down voltage converter 100 and the inverters 18A, 18C, and 20.

One end of the reactor 101 is connected to the midpoint of the voltage raising IGBT 102A and the voltage lowering IGBT 102B, and the other end of the reactor 101 is connected to one of the power supply connection terminals 104. The reactor 101 is provided to supply the induced electromotive force produced by the switching ON/OFF of the voltage raising IGBT 102A to the DC bus 110.

Each of the voltage raising IGBT 102A and the voltage lowering IGBT 102B is formed by a bipolar transistor in which a MOSFET (metal oxide semiconductor field effect transistor) is incorporated in the gate portion. Each of the voltage raising IGBT 102A and the voltage lowering IGBT 102B is a semiconductor element which is capable of switching large electric power at high speed. Each of the voltage raising IGBT 102A and the voltage lowering IGBT 102B is driven by the controller 30 which supplies a pulse width modulation (PWM) voltage to the gate terminal. A diode 102*a* and a diode 102*b*, which are rectifier elements, are connected in parallel to the voltage raising IGBT 102A and the voltage lowering IGBT 102B respectively.

The capacitor 19 may be a chargeable and dischargeable capacitor which enables the electric power to be delivered and received between the capacitor 19 and the DC bus 110 via the up-down voltage converter 100. In FIG. 4, the capacitor 19 which is an electrical power storage device of the hybrid excavator is illustrated. Alternatively, a chargeable and dischargeable secondary battery, such as a lithium ion battery, a lithium ion capacitor, or another power supply which can deliver and receive electric power may be used instead of the capacitor 19.

The power supply connection terminals 104 and the output terminals 106 may be terminals which can connect the capacitor 19 and the DC bus 110. The capacitor voltage detecting part 112 which detects the capacitor voltage value is connected between the power supply connection terminals 104. The DC bus voltage detecting part 111 which detects the DC bus voltage value is connected is connected between the output terminals 106.

The capacitor voltage detecting part 112 detects the voltage value (vbat_det) of the capacitor 19. The DC bus voltage detecting part 111 detects the voltage value (the DC bus voltage: vdc_det) of the DC bus 110. The smoothing capacitor 107 is an electrical power storage element which is inserted between the positive-electrode terminal and the negative-electrode terminal of the output terminals 106 and provided to smooth the DC bus voltage. The voltage of the DC bus 110 is maintained at a predetermined voltage by the smoothing capacitor 107. The capacitor current detecting part 113 is a detecting part to detect the value of the current which flows through the capacitor 19. The capacitor current detecting part 113 includes a resistor for current detection. The capacitor current detecting part 113 detects the current value (ibat_det) of the current flowing through the capacitor 19.

When raising the voltage of the DC bus 110 by the up-down voltage converter 100, the PWM voltage is supplied to the gate terminal of the voltage raising IGBT 102A, and the induced electromotive force generated in the reactor 101 by the switching ON/OFF of the voltage raising IGBT 102A is supplied to the DC bus 110 through the diode 102b connected in parallel to the voltage lowering IGBT 102B. Thereby, the voltage of the DC bus 110 is increased.

When lowering the voltage of the DC bus 110 by the up-down voltage converter 100, the PWM voltage is supplied to the gate terminal of the voltage lowering IGBT 102B, and the regeneration power supplied via the voltage lowering IGBT 102B and the DC bus 110 is supplied from the DC bus 110 to the capacitor 19. Thereby, the capacitor 19 is charged by the power stored in the DC bus 110 and the voltage of the DC bus 110 is lowered.

In practical applications, a drive part which generates the PWM signal for driving the voltage raising IGBT 102A and the voltage lowering IGBT 102B is provided between the controller 30 and each of the voltage raising IGBT 102A and the voltage lowering IGBT 102B. However, the illustration of the drive part is omitted in FIG. 4. Such a drive part may be constructed by either an electronic circuit or a processor unit.

In the hybrid excavator described above, the charging ratio SOC of the capacitor 19 is always maintained in a high state, and the electric load can be driven by using the power from the electrical power storage device with good energy efficiency.

In the hybrid excavator according to the related art, the target SOC of the electrical power storage device is set to a small value, for example, 80%, so that overcharging of the electrical power storage device may not take place even if large regeneration power is supplied from the electric load to the electrical power storage device. Or, in the hybrid excavator according to the related art, the target SOC has been set up to 70% with a margin being left, so that even when large power is supplied to the electrical power storage device due to sudden power generation and regeneration, the SOC of the electrical power storage device in the charged state of the electrical power storage device will not reach 100%. Hence, the SOC of the electrical power storage device is controlled to be always 70% or less, so that the output voltage of the electrical power storage device will be a low voltage corresponding to the SOC of 70% or less.

If the target SOC of the electrical power storage device is set to a value higher than that according to the related art, the output voltage of the electrical power storage device becomes high and the electric load can be driven efficiently. In other words, the electric load can be driven more efficiently than the related art if the output voltage of the electrical power storage device is set to a higher voltage value and the electric load is driven by the higher voltage value.

When a small-size electrical power storage device with a small capacitance is used in order to reduce the cost of the electrical power storage system, a large amount of electric power can be stored in the electrical power storage device if the target SOC of the electrical power storage device is set to a high value. For example, if the target SOC of the electrical power storage device can be set to a higher value, a small-size electrical power storage device can be used without reducing the storage amount of the electrical power storage device according to the related art.

After a normal operating state of the drive part in the driving system of the hybrid excavator and the amount of charge (Ah) and the charging ratio (%) of the electrical power storage device are taken into consideration, it has been found out that setting the target SOC of the electrical power storage device to be below 90% is satisfactory for the normal use. Hence, if the target SOC of the electrical power storage device is set to be below 90%, the electric load can be efficiently driven by a high voltage, and miniaturization of the electrical power storage device and the cost reduction are possible.

However, for example, in a case where the target SOC of the electrical power storage device is set to 90%, there is a possibility that overcharging of the electrical power storage device takes place when large regeneration power occurs in the state where the charging ratio (SOC) of the electrical power storage device is relatively high. To eliminate the problem, in a first embodiment of the present disclosure which will be described below, the charging ratio (SOC) of the electrical power storage device is controlled variably. Namely, when it is predicted that large regeneration power arises, the charging ratio (SOC) of the electrical power storage device is lowered in advance, so that the SOC after the large regeneration power is stored in the electrical power storage device does not exceed the upper limit of the system.

In the first embodiment, at the time of decelerating the upper turning body 3, the turning motor 21 functions as a dynamo which generates regeneration power (turning regeneration power) and supplies the regeneration power to the electrical power storage system 120. In addition, when lowering the boom 4, the hydraulic fluid returned from the boom cylinder 7 is used to drive the boom regeneration motor 300 so that regeneration power (boom regeneration power) is generated, and supplied to the electrical power storage system 120.

In this embodiment, the capacitor 19 is operated at an increased charging ratio SOC which is high enough to increase the amount of electric power stored therein. Hence, the discharge voltage of the capacitor 19 is maintained at a high level to allow discharging of the capacitor 19 at a high voltage and prevent shortage of power, so that the energy efficiency is increased. In such a case, if large turning regeneration power or large boom regeneration power is generated and supplied to the capacitor 19, the capacitor 19 is charged with the large amount of electric power in the high SOC state so that the capacitor 19 is in an overcharge state.

To eliminate the problem, in this embodiment, it is detected in advance whether turning regeneration power or boom regeneration power is generated. When it is detected that such power is generated, the SOC of the capacitor 19 is lowered to prevent the capacitor 19 from being in an overcharge state. Specifically, an estimated value of turning regeneration power and an estimated value of boom regeneration power are computed, and a target value of SOC is determined and changed based on the estimated turning regeneration power value (estimated turning regeneration energy) and the estimated boom regeneration power value (boom regeneration energy). Normally, the target value of SOC is set to a fixed value based on the control condition of the system. In this embodiment, however, the target value of SOC is changed variably at any time based on the estimated regeneration power (the estimated regeneration energy).

Figure 5:
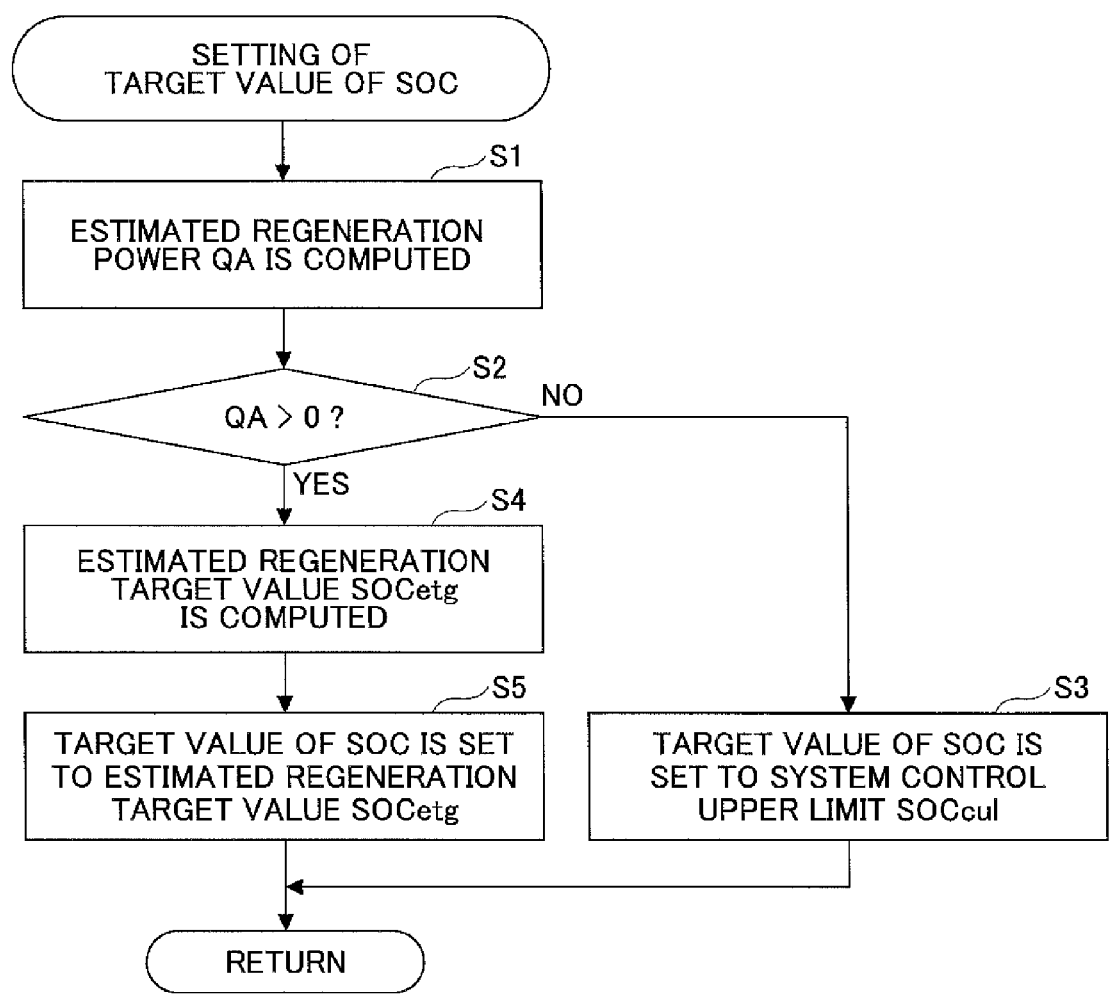
FIG. 5 is a flowchart for explaining the process which sets up a target value of (SOC).

FIG. 5 is a flowchart for explaining the process which sets up the target value of SOC.

First, an estimated regeneration power QA is computed in step S1. In this embodiment, the estimated regeneration power QA is computed as the sum of an estimated turning regeneration power (estimated turning rotational energy) QS and an estimated boom regeneration power (estimated boom potential energy) QB.

Subsequently, in step S2, it is determined whether the estimated regeneration power QA is larger than zero. In other words, it is determined whether the estimated regeneration power QA takes place. When the estimated regeneration power QA is zero, the process progresses to step S3. For example, when the bucket drive operation and the arm drive operation other than the turning or the boom drive operation is performed, it is estimated that regeneration power does not take place.

In step S3, the SOC target value SOCtg which is the electrical power storage target value is set to a system control upper limit SOCcul. In this case, the process is terminated. The system control upper-limit SOCcul is a upper limit of SOC which is determined depending on the control of the hybrid excavator. When a detection value of SOC exceeds the system control upper limit SOCcul, it is determined that the capacitor 19 is in an overcharged state.

On the other hand, when the estimated regeneration power QA is larger than zero, the process progresses to step S4. In this case, it is estimated that regeneration power takes place. In step S4, an estimated regeneration target value SOCetg is computed based on the computed estimated regeneration power QA. The estimated regeneration target value SOCetg is a value of SOC which does not cause the SOC value of the capacitor 19 to exceed the system control upper limit SOCcul even if the estimated regeneration power QA is supplied to the capacitor 19. The estimated regeneration target value SOCetg is smaller than the system control upper limit SOCcul.

After the estimated regeneration target value SOCetg is computed in step S4, the process progresses to step S5. In step S5, the SOC target value SOCtg which is the electrical power storage target value is set to the estimated regeneration target value SOCetg. In this case, the process is terminated. The estimated regeneration target value SOCetg varies according to the value of the estimated regeneration power QA, and the SOC target value SOCtg also varies according to the value of the estimated regeneration power QA.

The processing of step S3 and the processing of step S5 are performed by an electrical power storage target value control unit in the controller 30.

Next, the process which computes the estimated regeneration power QA in the step S1 will be described. The computation of the estimated regeneration power QA is performed by the estimated regeneration energy computing unit in the controller 30.

Figure 6:
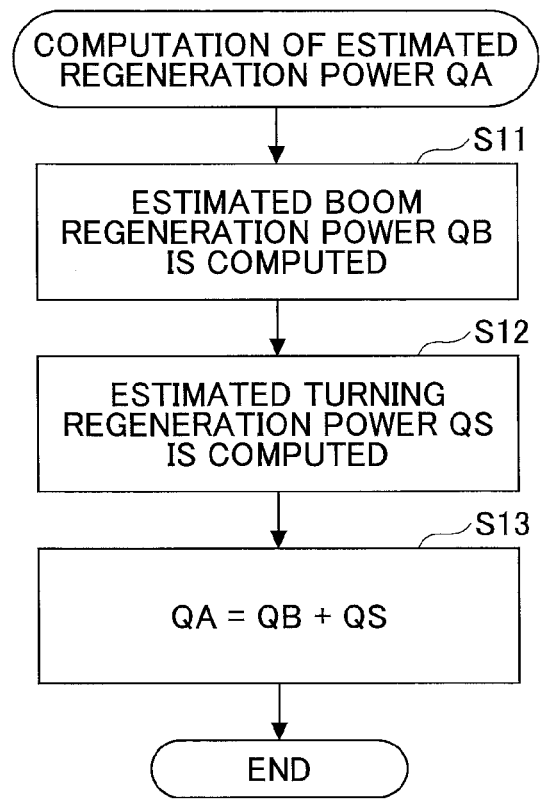
FIG. 6 is a flowchart for explaining the process which computes an estimated regeneration power.

FIG. 6 is a flowchart for explaining the process which computes the estimated regeneration power QA. First, in step S11, an estimated boom regeneration power QB is computed. The estimated boom regeneration power QB is determined by the potential energy of the boom 4. Namely, the estimated boom regeneration power QB is equivalent to the potential energy in the position in which the boom 4 is lifted.

Figure 7:
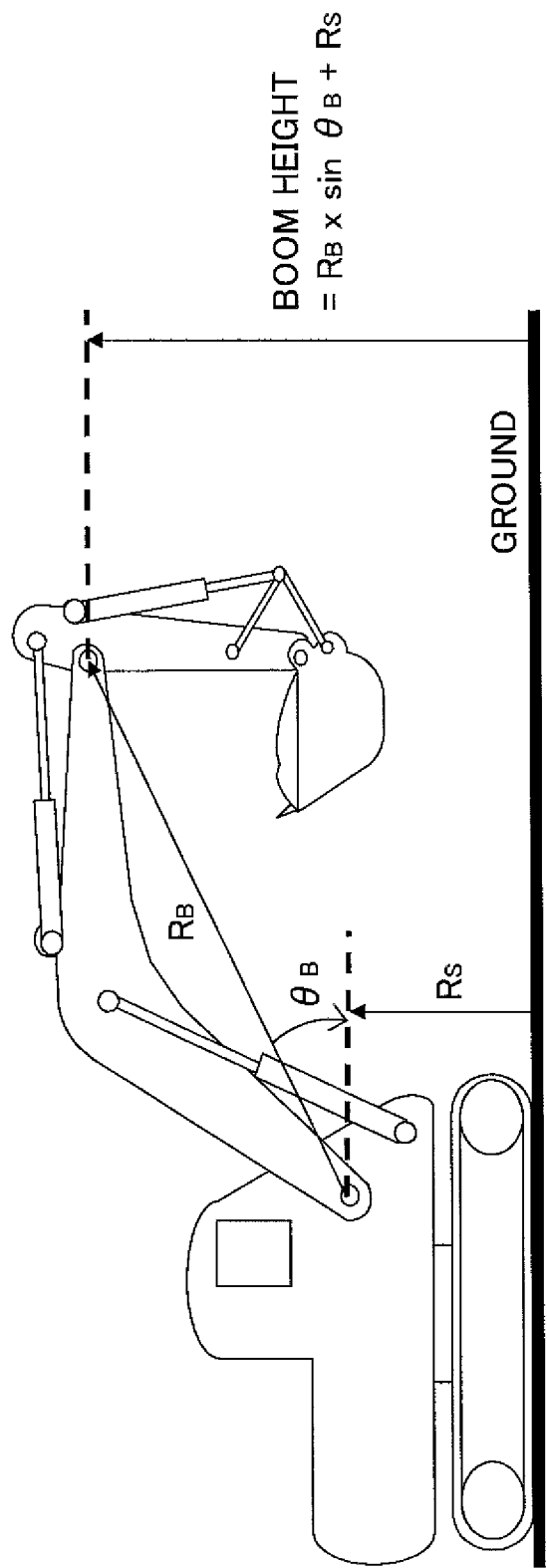
FIG. 7 is a diagram for explaining an estimated boom regeneration power.

FIG. 7 is a diagram for explaining the estimated boom regeneration power QB. When the boom 4 of the hybrid excavator is lifted, the potential energy needed to lift the weight of the boom 4, the arm 5, and the bucket 6 is stored. Subsequently, if the boom 4 is lowered, the stored potential energy is released (the return hydraulic fluid of the boom cylinder 7) and the boom regeneration hydraulic motor 310 is driven. In this case, the boom regeneration motor 300 is driven and electric power is regenerated. The power obtained by this power generation is equivalent to the boom regeneration power. In this embodiment, before the boom regeneration power is generated, an estimated boom regeneration power for lowering the boom 4 from the position (height) where the boom 4 is lifted to the horizontal position is computed as the estimated boom regeneration power QB.

The height H of the boom 4 from the ground is computed by the formula $H=RB \times \sin\theta B+RS$ as follows. The distance RB from the supporting point of the boom 4 to the end of the boom 4 is multiplied by $\sin\theta B$. And the distance (height) RS of the supporting point of the boom 4 from the ground is added to the product $RB \times \sin\theta B$. The boom angle $\theta B$ is a detection value which is detected by the boom angle sensor 7B. The position where the boom 4 is lowered from the position where the boom 4 is lifted is not necessarily the horizontal position. However, if the boom regeneration power is computed under the assumption that the boom 4 is lowered to the horizontal position, the computed value is approximate to the maximum regeneration power obtained from the position where the boom 4 is lifted.

As described above, the estimated boom regeneration power QB may be computed by multiplying the weight m, which is the sum of the maximum weight of the sand contained in the bucket 6 and the weight of the boom 4, the arm 5 and the bucket 6, by the gravity g, and further multiplying the resultant value by the height H of the end of the boom 4 from the ground, as follow.

$$QB = m \times g \times H$$
$$= m \times g \times (RB \times \sin\theta B + RS).$$

As described above, after the estimated boom regeneration power QB is computed in step S11, the process progresses to step S12. In step S12, the computation of the estimated turning regeneration power QS is performed. The computation of the estimated turning regeneration power QS may be computed in accordance with the formula:

$$QS = \tfrac{1}{2} \times Mi \times \omega^2$$

where Mi is the moment of inertia of the upper turning body 3, and $\omega$ is the angular velocity of the turning movement of the upper turning body 3. The value of Mi is taken as the maximum moment of inertia in the state where the boom 4 and the arm 5 are extended. The angular velocity $\omega$ may be determined based on the rotational speed of the turning motor 21 detected by the resolver 22.

After the estimated turning regeneration power QS is computed in step S12, the process progresses to step S13. In step S13, the estimated boom regeneration power QB and the estimated turning regeneration power QS are added together, and the estimated regeneration power is computed by the formula QA=QB+QS.

Next, the processing of step S4 in FIG. 5 will be described. The processing of step S4 is the process which computes the estimated regeneration target value SOCetg. The process of computing the estimated regeneration target value SOCetg is performed by an electrical power storage target value determining unit in the controller 30.

Figure 8:
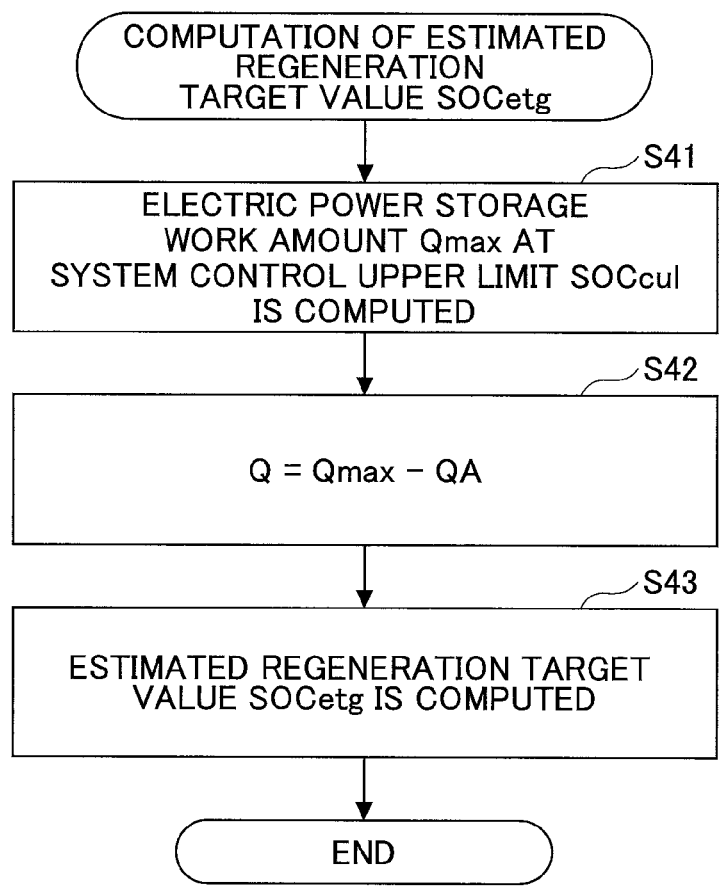
FIG. 8 is a flowchart for explaining the process which computes an estimated regeneration target value.

FIG. 8 is a flowchart for explaining the process which computes an estimated regeneration target value SOCetg. First, in step S41, an electrical power storage work amount Qmax which is the power stored in the capacitor 19 when the charging ratio (SOC) of the capacitor 19 reaches the system control upper limit SOCcul is computed.

The electrical power storage work amount Qmax is equivalent to the maximum power that can be stored in the capacitor 19 according to the system control. When the electrostatic capacity of the capacitor is used, the electrical power storage work amount Qmax may be computed in accordance with the formula:

$$Qmax = 1/2 \times C \times V^2$$
$$= 1/2 \times C \times (360 \times \sqrt{SOCcul})^2$$

where C is the electrostatic capacity of the capacitor 19.

Next, in step S42, the target value Q of the power which can be stored in the capacitor 19 is computed by subtracting the estimated regeneration power QA from the electrical power storage work amount Qmax (Q=Qmax−QA).

In step S43, an estimated regeneration target value SOCetg is computed based on the target value Q of power. The estimated regeneration target value SOCetg may be computed in accordance with the formula: SOCetg=2×Q/(C×360$^2$).

After the estimated regeneration target value SOCetg is computed as described above, in step S5 of the process of FIG. 5, the SOC target value SOCtg is set to the estimated regeneration target value SOCetg.

Figure 9:
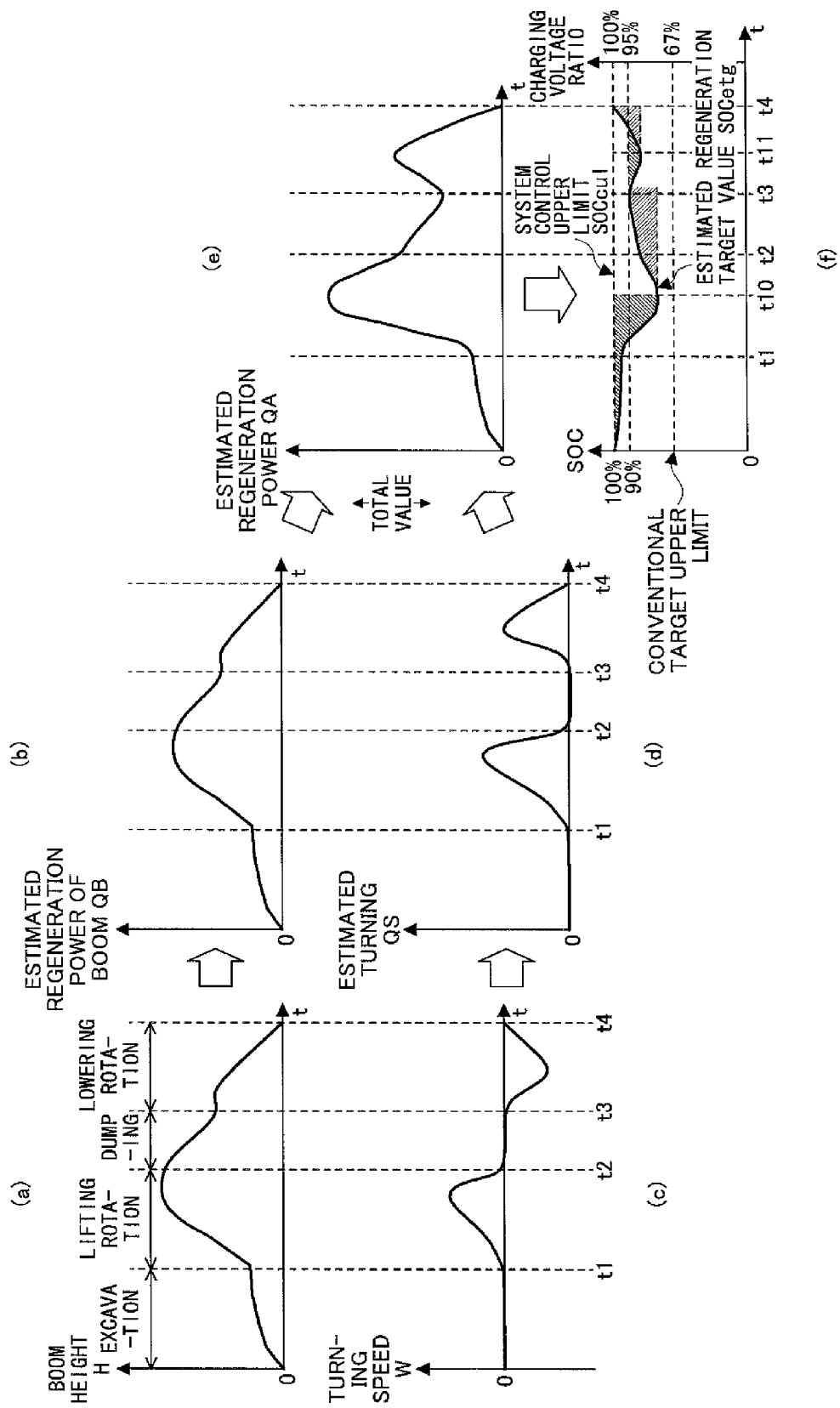
FIG. 9 is a diagram for explaining the process which sets up an SOC target value in excavation and dumping work.

Next, the setting of the SOC target value in the excavation and dumping work performed by the hybrid excavator will be described. FIG. 9 is a diagram for explaining the process which sets up the SOC target value SOCtg in the excavation and dumping work. Because it is expected that the estimated regeneration power QA is present during the work period from time 0 to time t4 in FIG. 9, the SOC target value SOCtg as the electrical power storage target value is set to the estimated regeneration target value SOCetg.

In the excavation and dumping work, the height H of the boom 4 changes as shown in FIG. 9(a). The estimated boom regeneration power QB is proportional to the height H of the boom 4 as described above (QB=m×g×H), and the changes of the estimated boom regeneration power QB are in the same pattern as the changes of the height H of the boom 4, as shown in FIG. 9(b).

The boom 4 is lowered after the time the height H of the boom 4 reaches the peak, and the boom regeneration power takes place.

On the other hand, in the excavation and dumping work, the turning speed of the upper turning body 3 is proportional to the angular velocity ω of the turning motor 21, and the turning speed of the upper turning body 3 changes during the excavation and dumping work as shown in FIG. 9(c). The estimated turning regeneration power QS is proportional to the square of the angular velocity ω of the turning motor 21 as described above (QS=½×Mi×ω)$^2$), and the estimated turning regeneration power QS changes as shown in FIG. 9(d).

The turning speed decreases after the time the angular velocity ω reaches the peak, and the turning regeneration power takes place. The minus direction (negative value) of the turning speed means the reverse rotation, and the estimated turning regeneration power is computed using the absolute value of the turning speed.

The estimated regeneration power QA is the sum of the estimated boom regeneration power QB and the estimated turning regeneration power QS, and changes of the estimated regeneration power QA are in the pattern as shown in FIG. 9(e), which is a resultant pattern of the pattern of FIG. 9(b) and the pattern of FIG. 9(d).

The estimated regeneration target value SOCetg is set up to the value that does not exceed the permissible maximum charging ratio (the system control upper limit SOCcul) of the capacitor 19 according to the system control when the estimated regeneration power QA is supplied to the capacitor 19 and the capacitor 19 is charged with the estimated regeneration power QA. Hence, the estimated regeneration target value SOCetg is obtained by subtracting the estimated regeneration power QA from the system control upper limit SOCcul, and changes of the estimated regeneration target value SOCetg are in the pattern as shown in FIG. 9(f).

With reference to FIG. 9(f), the case in which the charging voltage value of the capacitor 19 in the time t=0 is considered as 100% of the rated voltage will be described. In the period of time 0 to time t10, the boom 4 is lifted while the turning operation is performed. In this case, according to the increase in the computed estimated regeneration power, the SOC target value SOCtg (which is, in this case, the estimated regeneration target value SOCetg) is lowered. Because the estimated regeneration target value SOCetg is lowered from the system control upper limit SOCcul, the percentage of the stored power corresponding to the decrease of the estimated regeneration target value SOCetg is discharged. In this case, the power discharged can be used for the lifting of the boom 4 or the power operation of the turning.

In the period of time t10 to time t3 in FIG. 9(f), the boom 4 is lowered, and in the period of time t10 to time t2 in FIG. 9(f), the turning speed is decreased. Therefore, in the period of time t10 to time t3, the computed estimated regeneration power QA is decreased. In this case, the SOC target value SOCtg (which is, in this case, the estimated regeneration target value SOCetg) is increased. The boom regeneration power takes place because of the lowering of the boom 4 in the period of time t10 to time t3, and the turning regeneration power also takes place because of the braking operation (decelerating operation) of the turning motor in the period of time t10 to time t2. The percentage of such regeneration power corresponding to the increase of the estimated regeneration target value SOCetg can be stored in the capacitor 19 by charging of the capacitor 19.

Similarly, in the period of time t3 to time t11, the estimated regeneration target value SOCetg is decreased and discharging of the capacitor 19 corresponding to the decrease of the estimated regeneration target value SOCetg is performed. In the period of time t11 to time t4, the estimated regeneration target value SOCetg is increased and charging of the capacitor 19 corresponding to the increase of the estimated regeneration target value SOCetg is performed.

The electrically stored energy E which is stored in the capacitor 19 is represented by the formula E=(½)CV$^2$ where C denotes the electrostatic capacity of the capacitor 19 and V denotes the charging voltage (the voltage between the terminals) of the capacitor 19. Hence, if the charging voltage V is increased, the capacity of the capacitor 19 for storing the same electric energy can be reduced. In the conventional system according to the related art, in order for the SOC not to exceed the system control upper limit, the SOC target value is determined by taking into consideration the regeneration power. For example, the conventional SOC target value is set to 67% (=V/Vmax: the charging ratio) of the rated voltage (Vmax). When the system control upper limit is reached, the SOC is set up so that the charging voltage is equal to 100% (=V/Vmax: the charging ratio) of the rated voltage.

As is apparent from the formula $E=(½)CV^2$, if the charging voltage value V of the capacitor 19 is multiplied by $\sqrt{2}$, the capacitor 19 is able to store the electrically stored energy E which is the same as that when ½ of the electrostatic capacity is used. In other words, if the charging voltage value V is multiplied by $\sqrt{2}$, the electrostatic capacity of the capacitor can be reduced to ½.

Conventionally, the SOC by which the charging voltage is 67% of the rated voltage has been used. In this embodiment, the SOC of 95% which is obtained by multiplying the conventional SOC value by $\sqrt{2}$ may be used. In other words, by changing the charging ratio to 95%, the capacitor with ½ of the electrostatic capacity may be used while maintaining the same electrically stored energy as the case where the SOC of 67% is used. When the charging ratio is 95%, the SOC is about 90% because the SOC is expressed by the ratio of the square of the voltage V ($SOC=(½)CV^2/(½)CVmax^2$).

In the example of FIG. 9(f), the case in which the SOC is 90% (the charging ratio is 95%) has been described. However, it is desirable that, when no regeneration power is present, the SOC (charging ratio) is set to a higher value, which enables the electrostatic capacity of the capacitor to be reduced.

In this embodiment, when no regeneration power is present, the SOC is controllable to be above about 90% (the charging ratio is 95%). In other word, the electrostatic capacity of the capacitor capacity can be reduced to ½ of the conventional value. Hence, using the hybrid excavator of this embodiment provides increased flexibility of selection of the capacitor 19. The target value of SOC is variably controllable and when it is expected that regeneration power is present, the target ratio of SOC can be reduced in advance. Thus, it is possible to present overcharge of the capacitor 19.

As is apparent from FIG. 9(f), the estimated regeneration target value SOCetg computed in this embodiment when it is estimated that regeneration power is not present (QA=0) is equal to the system control upper limit SOCcul which is larger than the conventional SOC target upper limit. The estimated regeneration target value SOCetg computed in this embodiment when it is estimated that regeneration power is present (QA>0) is equal to the value which is obtained by subtracting the charging ratio (which increases from the system control upper limit SOCcul when the capacitor 19 is charged by the estimated regeneration power QA) from the system control upper limit SOCcul. Accordingly, it is possible to control the capacitor 19 so that the charging ratio of the capacitor 19 does not exceed the system control upper limit SOCcul even when regeneration power is supplied to the capacitor 19, while maintaining the charging ratio of the capacitor 19 to the value near the system control upper limit SOCcul.

In the above-described embodiment, the estimated regeneration power QA is computed by adding together the estimated boom regeneration power QB and the estimated turning regeneration power QS. However, it is not necessary to add together the estimated boom regeneration power QB and the estimated turning regeneration power QS. For example, when the excavator has no boom regeneration function, only the estimated turning regeneration power QS may be used as the estimated regeneration power QA. Or, in a case of a lifting magnet type excavator including a lifting magnet attached to the end of the arm instead of the bucket (which has a lifting magnet regeneration function instead of turning regeneration and boom regeneration functions), the estimated regeneration power QA may be computed by adding together the estimated lifting magnet regeneration power QL. The regeneration power from the lifting magnet is generated by the reverse current flowing when the lifting magnet is turned OFF, and this reverse current has an almost constant current value. Hence, the estimated lifting magnet regeneration power QL may be set to a fixed value. When the voltage value of the capacitor 19 during the period of time 0 to time t10 is smaller than the electrical power storage target value, charging of the capacitor 19 is performed. Similarly, when the voltage value of the capacitor 19 during the period of time t3 to time t11 is smaller than the electrical power storage target value, charging of the capacitor 19 is performed.

When it is expected that no regeneration power is present, the electrical power storage target value is set to the value which is equal to the system control upper limit. Alternatively, when it is expected that no regeneration power is present, the electrical power storage target value may be set to a value which is slightly smaller than the system control upper limit. Alternatively, the electrical power storage target value may be set to a value which falls within a predetermined range.

Figure 10:
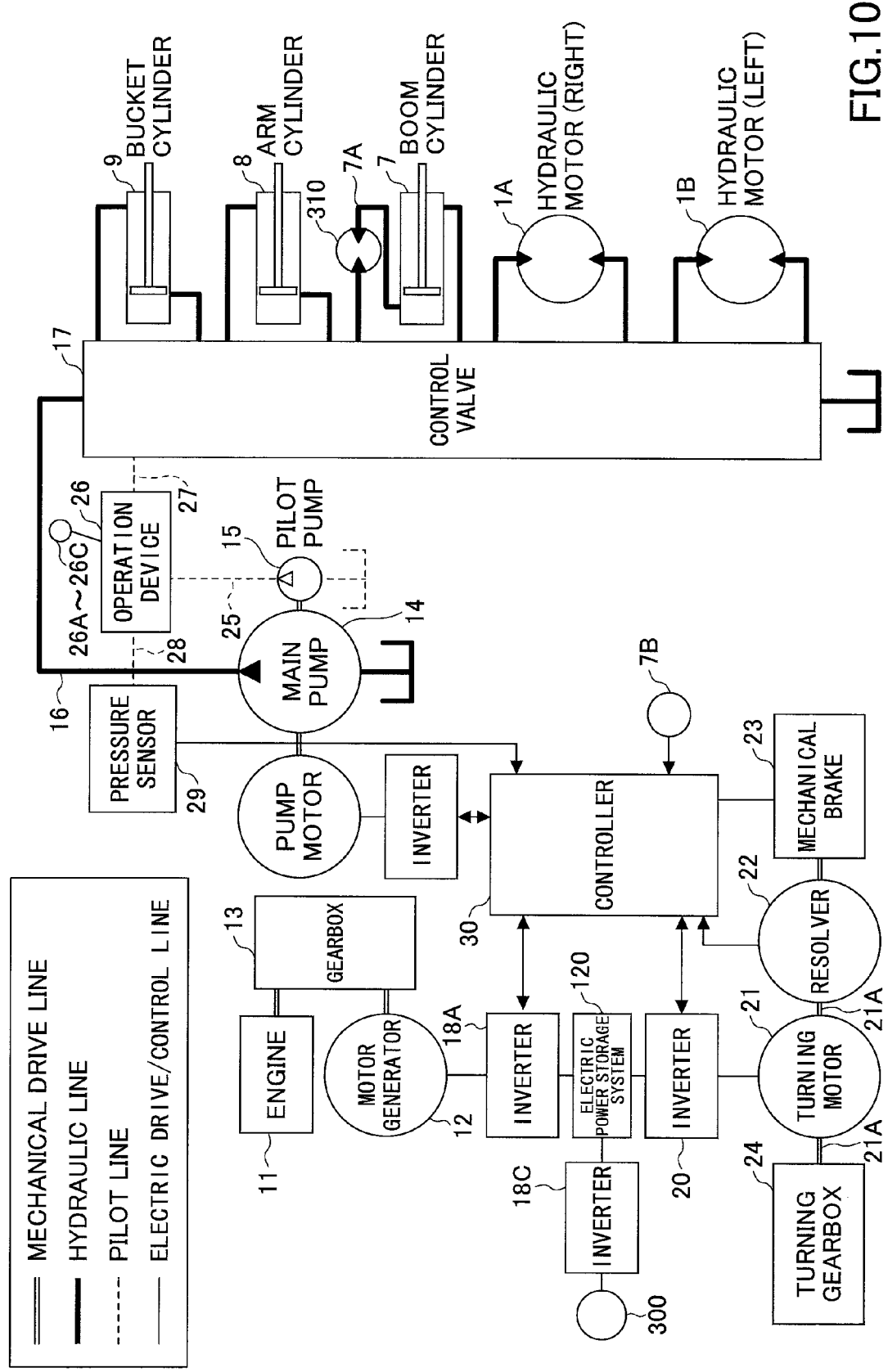
FIG. 10 is a block diagram showing the composition of a drive system of a series type hybrid excavator.

In the above-mentioned embodiment, the example of a parallel type hybrid excavator (in which the engine 11 and the motor generator 12 are connected in parallel to the main pump 14 as the hydraulic pump for driving the main pump) to which the present disclosure is applied has been described. Alternatively, the present embodiment is also applicable to a series type hybrid excavator in which the motor generator 12 is driven by the engine 11, the power generated by the motor generator 12 is stored in the electrical power storage system 120, and the main pump 14 is driven by the stored power only as shown in FIG. 10. In this case, it is assumed that the motor generator 12 in this embodiment has a dynamo function only to generate electric power when the motor generator 12 is driven by the engine 11.

Next, a second embodiment of the present disclosure will be described.

Figure 11:
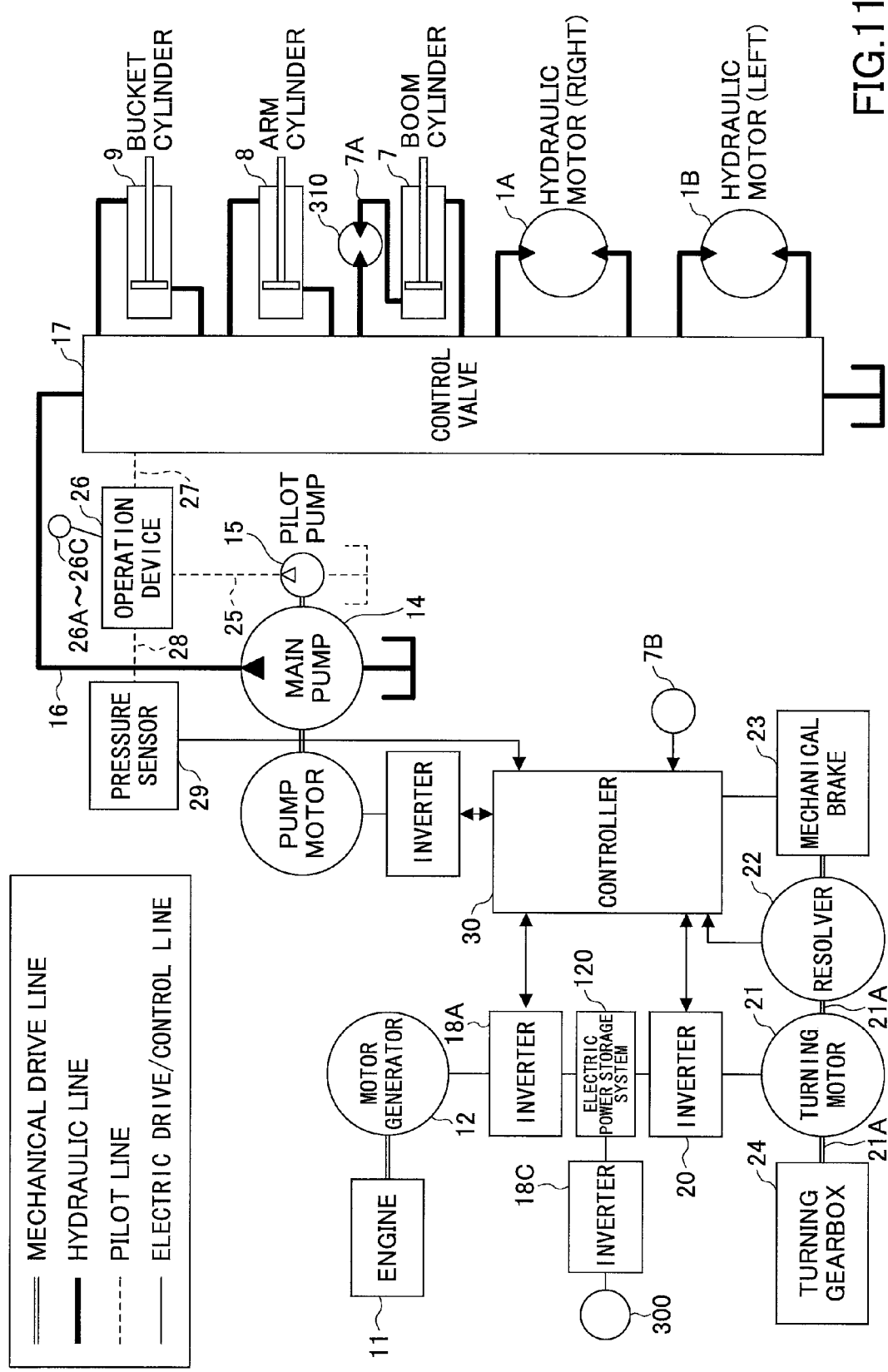
FIG. 11 is a block diagram showing the composition of a drive system of a hybrid excavator of a second embodiment of the present disclosure.

FIG. 11 is a block diagram showing the composition of a drive system of a hybrid excavator of the second embodiment. In FIG. 11, the elements which are the same as corresponding elements shown in FIG. 2 are designated by the same reference numerals, and a description thereof will be omitted.

In the hybrid excavator of FIG. 11, when a large load is put on the engine 11, a motor-assisted operation in which the motor generator 12 converts electrical energy into mechanical energy and assists the engine 11 by the mechanical energy is performed. The mechanical energy of the motor generator 12 is transmitted to the main pump 14 via the gearbox 13 and the load on the engine 11 is reduced. On the other hand, when a small load is put on the engine 11, the driving force of the engine 11 is transmitted to the motor generator 12 via the gearbox 13 and a power generating operation of the motor generator 12 is performed. Control of the switching of the motor generator 12 between the motor-assisted operation and the power generating operation is performed by using the inverter 18A connected (electrically connected) to the motor generator 12. The inverter 18A is controlled by a control signal output from the controller 30.

The controller 30 includes a central processing unit (CPU) and an internal memory. The CPU executes the drive control program stored in the internal memory. The controller 30 calls the operator's attention by displaying a degraded state of the relevant parts or the like on a display device (not shown).

The input/output terminals of the electric system of the motor generator 12 are connected to the DC bus 110 via the inverter 18A. The DC bus 110 is connected to the capacitor 19 via a converter (battery charge/discharge circuit) 100. The capacitor 19 may include a plurality of electric double layer capacitors which are connected in series. The voltage of the DC bus 110 is controllable by using the converter 100. For example, if a charging current is caused to flow through the converter 100, the electric energy of the DC bus 110 moves to the capacitor 19 and the voltage of the DC bus 110 is lowered. On the contrary, if a discharging current is caused to flow through the converter 100, the electric energy of the capacitor 19 moves to the DC bus 110 and the voltage of the DC bus 110 is increased. In this manner, the converter 100 controls charge/discharge operation between the capacitor 19 and the DC bus 110.

As described above, the capacitor 19 is equivalent to a first electrical power storage device that is capable of storing electricity and the DC bus 110 is equivalent to a second electrical power storage device that is capable of storing electricity. The converter 100 is equivalent to a charge/discharge control unit which electrically connects the capacitor 19 and the DC bus 110 and controls charge/discharge operation between the capacitor 19 and the DC bus in response to an externally supplied control signal. The electrical power storage system 120 including the capacitor 19, the converter 100, and the DC bus 110 is disposed in the upper turning body 3.

The DC bus 110 is connected to the boom regeneration motor 300 via the inverter 18C. The boom regeneration motor 300 is connected to the boom regeneration hydraulic motor 310 and can generate electric energy by the driving force of the hydraulic motor 310. The electric energy generated by the boom regeneration motor 300 is supplied to the DC bus 110 via the inverter 18C and this inverter converts the three-phase alternating current into the direct current. Further, the DC bus 110 is connected to the turning motor 21 via another inverter 20. The electric energy is exchanged between the DC bus 110 and the turning motor 21 through the inverter 20. Each of the inverters 20 and 18C and the converter 100 is controlled by a control signal output from the controller 30.

Figure 12:
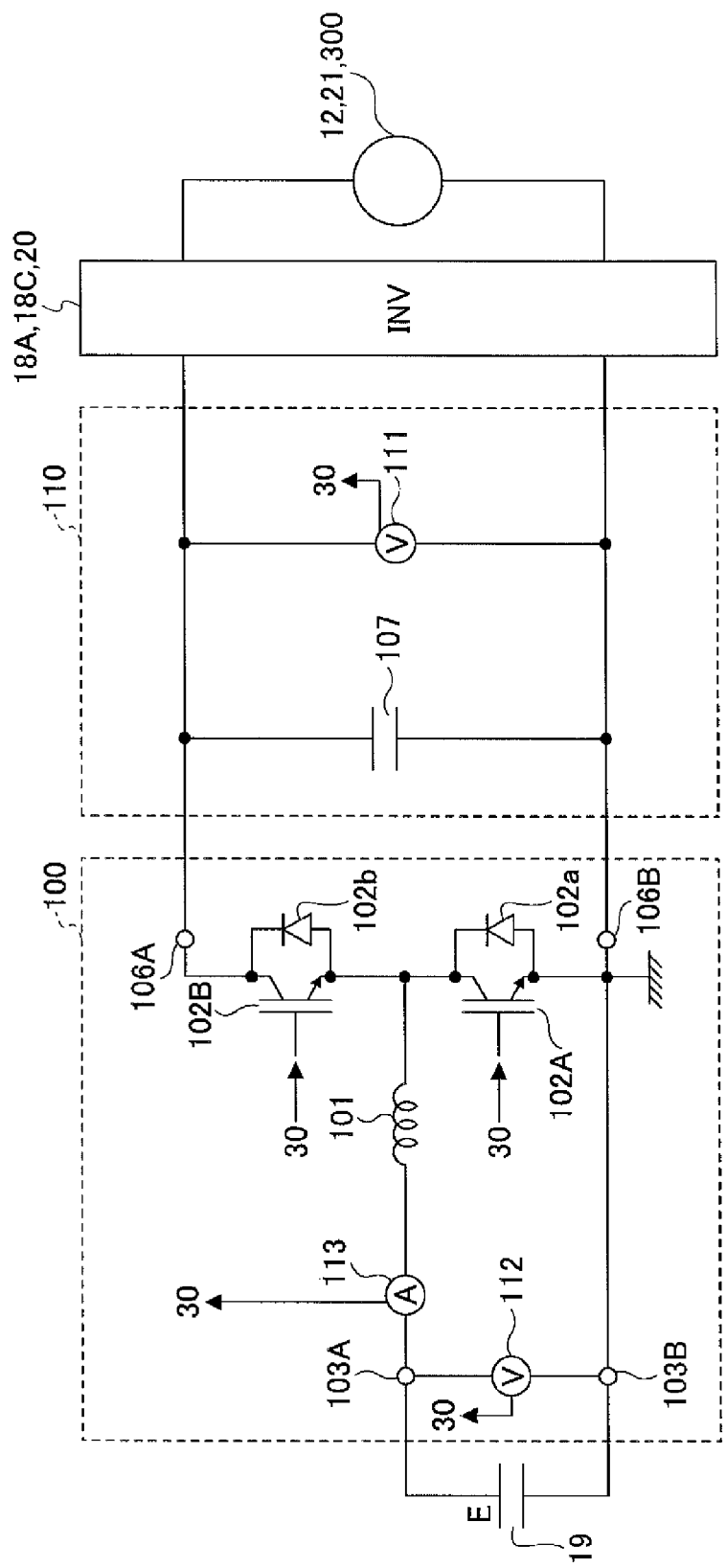
FIG. 12 is a diagram showing an equivalent circuit of an electrical power storage system of the second embodiment.

FIG. 12 is a diagram showing an equivalent circuit of the electrical power storage system 120 of this embodiment. The up-down voltage converter 100 controls the charge/discharge current of the capacitor 19 which is the first electrical power storage device. The DC bus 110 which is the second electrical power storage device includes a smoothing capacitor 107. The capacitor 19 is connected to a pair of power supply connection terminals 103A and 103B of the converter 100, and the smoothing capacitor 107 of the DC bus 110 is connected to a pair of output terminals 106A and 106B. The power supply connection terminal 103B (one of the pair of power supply connection terminals) and the output terminal 106B (one of the pair of output terminals) are grounded.

The DC bus 110 is connected to the motor generator 12, turning motor 21, and the boom regeneration hydraulic motor 310 via the inverters 18A, 18C, and 20, respectively.

When the power generating operation of the motor generator 12 is performed, the power generated by the motor generator 12 can be supplied to the capacitor 19 or the DC bus 110 via the inverter 18A. When the motor-assisted operation of the motor generator 12 is performed, the required electric power can be supplied from the capacitor 19 or the DC bus 110 to the motor generator 12 via the inverter 18A.

The electric energy is supplied from the capacitor 19 or the DC bus 110 to the turning motor 21. The regeneration energy generated by the turning motor 21 is stored in the capacitor 19 or the DC bus 110.

The voltage between the terminals of the smoothing capacitor 107 is detected by a voltage detecting part 111, and the detected voltage is input to the controller 30. The converter 100 is controlled based on the detected voltage from the voltage detecting part 111 and the target value of the DC bus 110, so that the voltage of the DC bus is maintained at the fixed value.

The controller 30 is capable of detecting the state (non-operating state) of the hybrid excavator in which none of the lower running body 1, the turning mechanism 2, the boom 4, the arm 5, and the bucket 6 operates and neither charging operation nor discharging operation of the capacitor 19 and the DC bus 110 is performed.

The series circuit in which the collector of the voltage raising IGBT (insulated gate bipolar transistor) 102A and the emitter of the voltage lowering IGBT 102B are connected to each other is connected between the output terminals 106A and 106B. The emitter of the voltage raising IGBT 102A is grounded and the collector of the voltage lowering IGBT 102B is connected to the high voltage output terminal 106A. The connection point of the voltage raising IGBT 102A and the voltage lowering IGBT 102B is connected to the high voltage power supply connection terminal 103A via the reactor 101.

A diode 102a is connected in parallel to the voltage raising IGBT 102A and a diode 102b is connected in parallel to the voltage lowering IGBT 102B respectively, such that the direction from the emitter to the collector is consistent with the forward direction.

A voltage detecting part 112 is connected between the power supply connection terminals 103A and 103B and detects the voltage between the terminals of the capacitor 19. A current detecting part 113 is connected in series to the reactor 101 and detects the charge/discharge current of the capacitor 19. The detected voltage and the detected current are input to the controller 30.

The controller 30 supplies a pulse-width-modulation (PWM) voltage (control signal) to the gate of each of the voltage raising IGBT 102A and the voltage lowering IGBT 102B.

In the following, the voltage raising operation (discharging operation) will be described. If the PWM voltage is supplied to the gate of the voltage raising IGBT 102A, the induced electromotive force occurs in the reactor 101 at the time of the OFF state of the voltage raising IGBT 102A in the direction to forward the current from the high voltage power supply connection terminal 103A to the collector of the voltage raising IGBT 102A. This electromotive force is supplied to the DC bus 110 via the diode 102b. In this manner, the voltage raising of the DC bus 110 is performed.

Next, the voltage lowering (charging operation) will be described. If the PWM voltage is supplied to the gate electrode of the voltage lowering IGBT 102B, the induced electromotive force occurs in the reactor 101 at the time of the OFF state of the voltage lowering IGBT 102B in the direction to forward the current from the emitter of the voltage lowering IGBT 102B to the high voltage power supply connection terminal 103A. The capacitor 19 is charged by this electromotive force. In this manner, the DC bus 110 can be controlled at a fixed voltage at any time.

Next, a controlling method of the hybrid excavator of a first comparative example of the second embodiment and a controlling method of the hybrid excavator of a first example of the second embodiment will be described with reference to FIG. 13A and FIG. 13B. These controlling methods are performed by the controller 30.

Figure 13A:
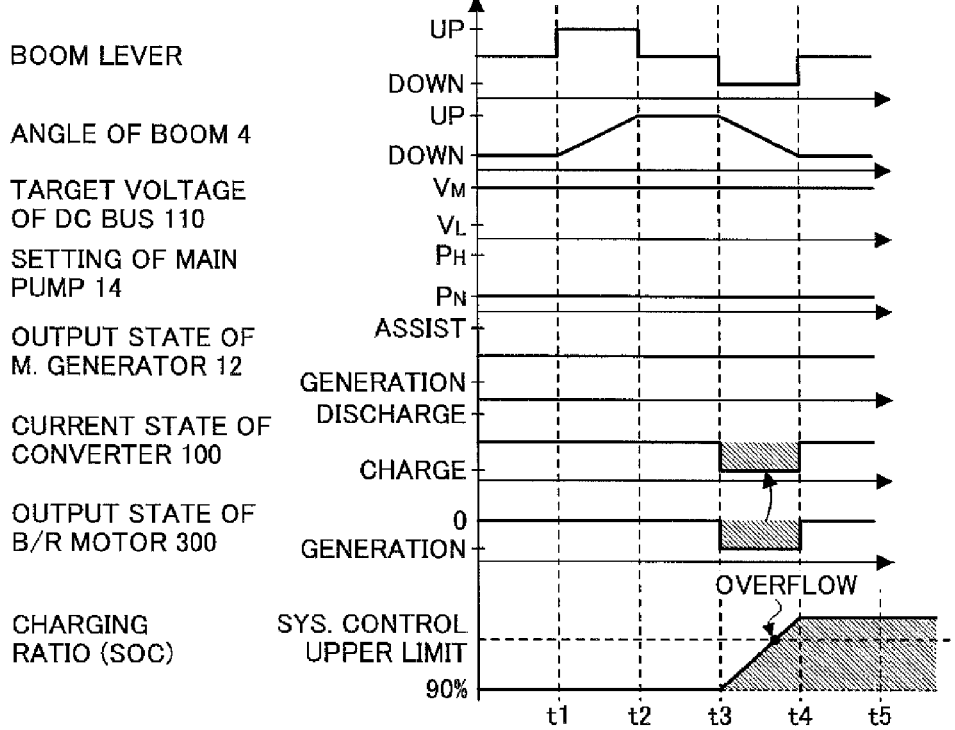
FIG. 13A and FIG. 13B are timing charts for explaining a controlling method of the hybrid excavator of a first comparative example of the second embodiment and a controlling method of the hybrid excavator of a first example of the second embodiment respectively.

FIG. 13A is a timing chart for explaining the controlling method of the first comparative example. As shown in the graphs of "boom lever" and "angle of boom 4", the operator of the hybrid excavator maintains the boom lever of the operation device 26 in the "lift" state during the period of time t1 to time t2, and the boom 4 is gradually lifted upward from the upper turning body 3. For example, in time t2, the boom 4 is lifted to the stroke upper limit (power generating operation). In time t2, the operator returns the boom lever to its neutral position and maintains that state until time t3. During this period, the boom 4 is maintained in the position of the stroke upper limit. Subsequently, during the period of time t3 to time t4, the operator maintains the boom lever in the "lower" state, and the boom 4 is gradually lowered. For example, the boom 4 is returned to the original position (the lowermost position in time t1) in time t4 (regeneration operation).

As shown in the graphs of "target voltage of DC bus 110", "setting of main pump 14", "output state of motor generator 12", and "current state of converter 100", in the controlling method of the first comparative example, the boom 4 is lifted only by the driving force of the engine 11 and the motor generator 12 does not perform the motor-driven (motor-assisted) operation. Hence, the DC bus 110 is maintained at the fixed voltage (high voltage state VM). In the following, the "target voltage of DC bus 110" denotes the target value to which the voltage of the DC bus 110 is changed.

Accordingly, all the graphs of "target voltage of DC bus 110", "setting of main pump 14", "output state of motor generator 12", and "current state of converter 100" are maintained at the constant level during the period of time t1 to time t2. In other words, the "target voltage of DC bus 110" is kept in the high voltage state VM and the "setting of main pump 14" is kept in the low-power output state PN. The motor generator 12 does not perform the motor-assisted operation or the power generating operation, and the converter 100 does not perform charge/discharge operation. Because the charge/discharge operation of the converter 100 is not performed, the voltage of the capacitor 19 does not change.

Also during the period of time t2 to time t3, the boom 4 is not moved, and all the graphs of "target voltage of DC bus 110", "setting of main pump 14", "output state of motor generator 12", and "current state of converter 100" are kept constant.

During the period of time t3 to time t4, the boom 4 is lowered, and the driving force (torque) occurs in the boom regeneration hydraulic motor 310. The driving force is transmitted to the boom regeneration motor 300, and power generation is performed by the boom regeneration motor 300 (regeneration operation). The generated electric energy is supplied to the inverter 18C, the DC bus 110, and the converter 100 and stored in the capacitor 19. Hence, during this period, the DC bus 110 is kept in the high voltage state VM but the converter 100 performs charging operation. During the period of time t3 to time t4, the energy generated by the boom regeneration motor 300 is stored in the capacitor 19 by the charging operation of the converter 100 as indicated by the arrow in FIG. 13A drawn from the graph of "output state of boom regeneration motor 300" to the graph of "current state of converter 100". The setting of the main pump 14 is maintained in the low-power output state PN and the motor generator 12 does not perform the motor-assisted operation or the power generating operation. In this manner, the charge/discharge control between the converter 100 and the capacitor 19 is performed to maintain the DC bus 110 in the high voltage state VM. Accordingly, the charge/discharge control operation causes the power consumption (energy loss).

As shown in the graph of "charging ratio SOC" of FIG. 13A, in the first comparative example, the SOC changes in the case in which the SOC is set to 90% when it is expected that no regeneration power is present. In this case, if boom regeneration power is present when the boom is lowered during the period of time t3 to time t4, the power by which the capacitor 19 is charged is increased and the SOC is increased. Because the SOC is initially set to 90% which is a relatively high target value, the SOC will exceed the system control upper limit (at which the SOC is 100%) during the period of time t3 to time t4 and overcharging of the capacitor 19 will take place.

Figure 13B:
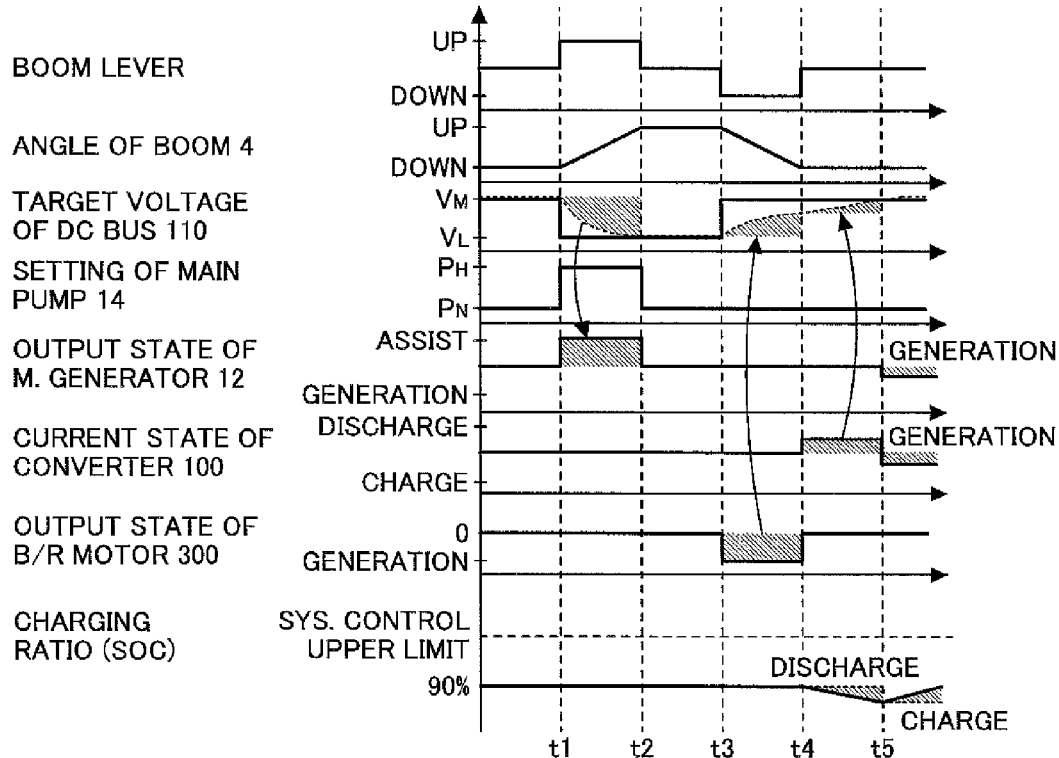

FIG. 13B is a timing chart for explaining the controlling method of the first example of the second embodiment. The graphs of "boom lever" and "angle of boom 4" in FIG. 13B are the same as those of the first comparative example in FIG. 13A.

In the controlling method of the first example, the boom 4 is lifted using the driving force of the engine 11 and the assist drive power of the motor generator 12. To perform the motor-assisted operation of the motor generator 12, the electric energy stored in the DC bus 110 is used instead of the capacitor 19.

Hence, during the period of time t1 to time t2 in which the boom 4 is lifted, the "output state of motor generator 12" is in the assist state and the "target voltage of DC bus 110" which is the electrical power storage target value is set in the low voltage state VL. The converter 100 does not perform the charge/discharge operation. Because the motor generator 12 performs the motor-assisted operation, the main pump 14 is shifted to the high-output state PH in which the high output can be generated.

In the graph of "target voltage of DC bus 110", the voltage value of the DC bus 110 actually detected by the voltage detecting part 111 is indicated by the dotted line. Because the engine 11 is assisted by the motor generator 12 during the period of time t1 to time t2, the voltage of the DC bus 110 is gradually decreased from the high voltage state VM to the low voltage state VL in time t2. As indicated by the arrow in FIG. 13B which is drawn from the graph of "target voltage of DC bus 110" to the graph of "output state of motor generator 12", the motor-assisted operation of the motor generator 12 is performed by the decrement of the voltage of the DC bus 110.

During the period of time t2 to time t3 in which the boom 4 is kept in the stroke upper limit position, the motor generator 12 does not perform the motor-assisted operation or the power generating operation. In this case, the electric energy stored in the capacitor 19 and the DC bus 110 does not change. Hence, the converter 100 does not perform the charge/discharge operation, and the target voltage and the actual voltage of the DC bus 110 are maintained in the low voltage state VL. The main pump 14 is maintained in the low power output state PN. In this manner, the DC bus 110 is maintained in the low voltage state VL and charge/discharge control between the DC bus 110 and the capacitor 19 is not performed. Therefore, it is possible to prevent occurrence of power loss.

During the period of time t3 to time t4, the boom 4 is lowered and the potential energy of the boom 4 is converted into electrical energy through the boom regeneration hydraulic motor 310 and the boom regeneration motor 300 (dynamo) (regeneration operation). The resulting electric power is stored in the DC bus 110 instead of the capacitor 19.

In this state, the converter 100 does not perform the charge/discharge operation with the capacitor 19. On the other hand, the target voltage of the DC bus 110 is set in the high voltage state VM. Hence, the actual voltage of the DC bus 110 is gradually increased from the low voltage state VL during the period of time t3 to time t4.

However, because the boom 4 is lifted during the period of time t1 to time t2, the electric energy discharged from the DC bus 110 is not completely collected by the lowering of the boom 4, and the actual voltage of the DC bus 110 in time t4 is lower than the high voltage state VM. The electric energy generated by the boom regeneration motor 300 is stored in the DC bus 110 and the voltage of the DC bus 110 is increased as indicated by the arrow in FIG. 13B. The main pump 14 is kept in the low power output state PN.

During the period of time t4 to time t5, the insufficiency of the voltage of the DC bus 110 is recovered to the high voltage state VM. Hence, the target voltage of DC bus 110 is maintained in the high voltage state VM and the converter 100 performs the discharge operation until the target voltage value VM is reached. The electric energy of the capacitor 19 is stored in the DC bus 110 by the discharge operation of the converter 100 as indicated by the arrow in FIG. 13B which is drawn from the graph of "current state of converter 100" to the graph of "target voltage of DC bus 110".

As shown in the graph of "charging ratio SOC" of FIG. 13B, the SOC changes according to the change of the voltage of the DC bus 110 in the first embodiment. In the first embodiment, when regeneration power is present during the period of time t3 to time t4, the boom regeneration power is stored in the DC bus 110 and the voltage of the DC bus 110 is increased. Hence, the regeneration power is not supplied to the capacitor 19 and the SOC of the capacitor 19 can be maintained in the high state. In other words, storing the regeneration power in the DC bus 110 prevents the capacitor 19 from being further charged by the regeneration power. Because the charging of the capacitor 19 the SOC of which SOC is high by the regeneration power is avoided, and it is possible to prevent the overcharging of the capacitor 19.

Because the voltage of the DC bus 110 is recovered during the period of time t4 to time t5 only, the capacitor 19 is slightly discharged and the resulting power is supplied to the DC bus 110. After time t5, the power generating operation of the motor generator 12 is performed and the capacitor 19 is charged, so that the charging ratio SOC of the capacitor 19 is set to the target charging ratio (90%). The target charging ratio in this case is equivalent to the voltage ratio of about 95%. When the charging ratio of the capacitor 19 is smaller than the target charging ratio during the period of time t4 to time t5, charging of the capacitor 19 is performed.

In the controlling method of the first example of the second embodiment, the motor-assisted operation of the motor generator 12 is performed using the electric energy stored in the DC bus 110 during the period of time t1 to time t2, and the motor-assisted driving force is added to the driving force of the engine 11, so that the boom 4 is lifted. Because a part of the energy released from the main pump 14 is supplied from the motor generator 12 when the boom 4 is lifted, the load of the engine 11 can be decreased. Hence, the setup pump power for the lifting of the boom 4 (setting of main pump 14) can be increased. Thus, the power for lifting the boom 4 can be increased.

Because the electric energy for performing the motor-assisted operation of the motor generator 12 is supplied from the DC bus 101 instead of the capacitor 19, it is possible to prevent the power consumption in the converter 100 (possible to reduce the energy loss).

The energy generated by the lowering of the boom 4 is stored in the DC bus 110 during the period of time t3 to time t4, instead of the capacitor 19. Hence, it is possible to prevent the power consumption in the converter 100 during this period.

By the discharge operation of the converter 100 during the period of time t4 to time t5, the electric energy of the capacitor 19 is moved to the DC bus 110 and the voltage state of the DC bus 110 is maintained in the constant state (the high voltage state VM). For example, when it is needed to lift the boom 4 again, the energy of the DC bus 110 can be used promptly according to the situation. The constant voltage (the high voltage state VM) in which the voltage of the DC bus 110 is maintained after time t5 is higher than the constant voltage in which the voltage of the capacitor 19 is maintained.

Next, a controlling method of the hybrid excavator of a second comparative example of the second embodiment and a controlling method of the hybrid excavator of a second example of the second embodiment will be described with reference to FIG. 14A and FIG. 14B. These controlling methods are performed by the controller 30.

Figure 14A:
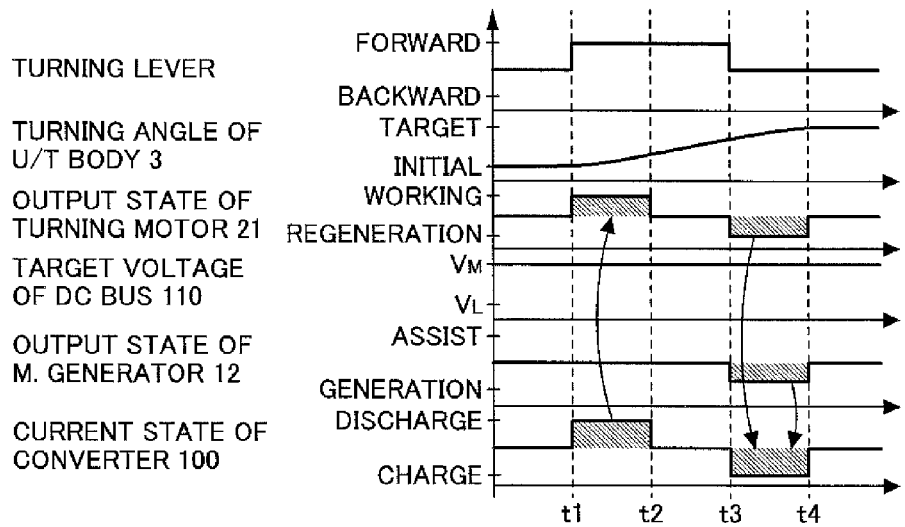
FIG. 14A and FIG. 14B are timing charts for explaining a controlling method of the hybrid excavator of a second comparative example of the second embodiment and a controlling method of the hybrid excavator of a second example of the second embodiment respectively.

FIG. 14A is a timing chart for explaining the controlling method of the second comparative example. As shown in the graphs of "turning lever", "turning angle of upper turning body 3", and "output state of turning motor 21", the operator of the hybrid excavator maintains the turning lever of the operation device 26 in the "forward rotation" state during the period of time t1 to time t3, and the upper turning body 3 is turned from the initial value to the target value. The upper turning body 3 starts turning in the direction of forward rotation from the stop state at the initial velocity of zero in time t1, arrives at the target position in time t4, and the terminal velocity is equal to zero so that the turning is stopped. During the period of time t1 to time t2, the angular velocity of the upper turning body 3 is gradually increased. During the period of time t2 to time t3, the upper turning body 3 is turned at the equal angular velocity. During the period of time t3 to time t4, the angular velocity of the upper turning body 3 is gradually decreased. The turning motor 21 generates a rotational force from the electric energy and performs the power generating operation for turning the upper turning body 3 during the period of time t1 to time t2 and performs the regeneration operation and generates electric energy from the turning rotation of the upper turning body 3 during the period of time t3 to time t4. During the period of time t2 to time t3, the turning motor 21 does not perform the power generating operation or the regeneration operation.

As shown in the graph of "current state of converter 100", in the controlling method of the second comparative example, the voltage of the DC bus 110 is maintained and the power generating operation of the turning motor 21 is performed using the electric energy stored in the capacitor 19. The regeneration energy generated by the turning motor 21 is stored in the capacitor 19. Hence, in the power operation during the period of time t1 to time t2, the converter 100 performs the discharging operation and releases the electric energy stored in the capacitor 19. During the period of time t3 to time t4, the converter 100 performs the charging operation and stores the resulting regeneration energy in the capacitor 19.

As shown in the graph of "output state of motor generator 12", the regeneration energy which is stored in the capacitor 19 during the period of time t3 to time t4 is smaller than the energy released from the capacitor 19 during the period of time t1 to time t2. Hence, during the period of time t3 to time t4, the motor generator 12 performs the power generating operation to compensate the insufficiency of the electric power, in order to maintain the voltage of the capacitor 19 at a constant level. The electric energy generated by the motor generator 12 is stored in the capacitor 19 by the charging operation of the converter 100.

As shown in the graph of "target voltage of DC bus 110", in the second comparative example, the power operation is performed by using the energy of the capacitor 19 and the resulting regeneration energy is stored in the capacitor 19. Hence, the target voltage of the DC bus 110 does not change and is maintained in the high voltage state VM. In this manner, the charge/discharge control operation is performed between the converter 100 and the capacitors 19 in order to maintain the voltage of the DC bus 110 in the high voltage state VM. Hence, the power consumption (energy loss) is caused by the charge/discharge control operation.

Figure 14B:
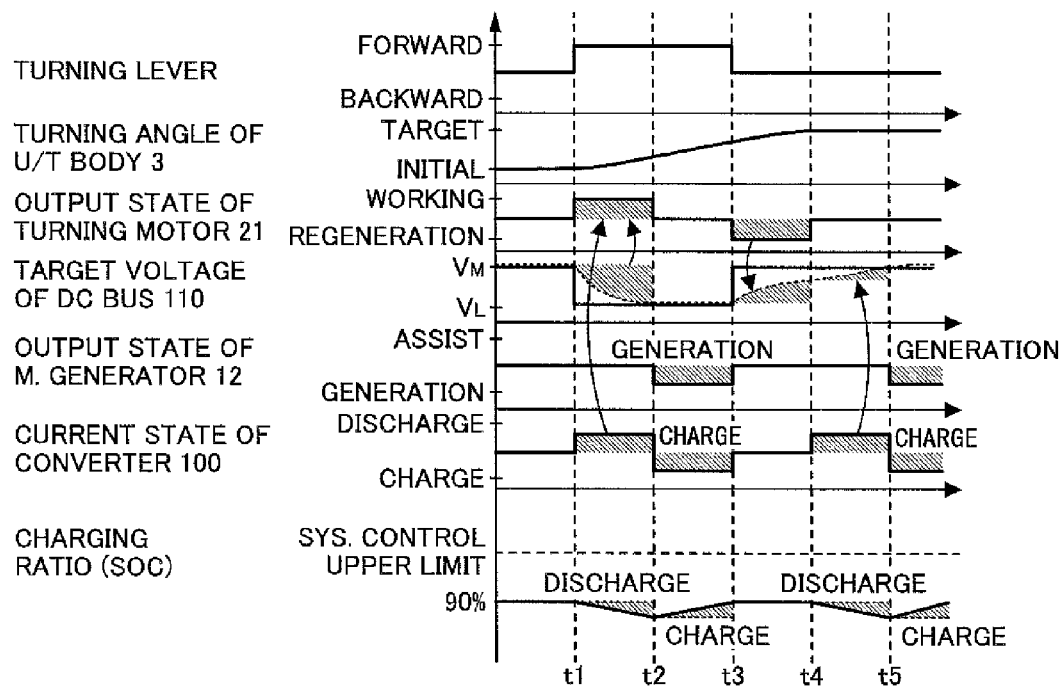

FIG. 14B is a timing chart for explaining the controlling method of the second example of the second embodiment. The graphs of "turning lever", "turning angle of upper turning body 3", and "output state of turning motor 21" in FIG. 14B are the same as those of the second comparative example in FIG. 14A.

In the controlling method of the second example of the second embodiment, the power generating operation of the turning motor 21 is performed using the electric energy stored in the capacitor 19 and the DC bus 110. The energy generated by the regeneration operation of the turning motor 21 is stored in the DC bus 110 instead of the capacitor 19.

As shown in the graphs of "target voltage of DC bus 110" which is the electrical power storage target value, "output state of motor generator 12", and "current state of converter 100", the electric energy of the DC bus 110 is used to perform the power operation during the period of time t1 to time t2, and the target voltage of the DC bus 110 is shifted from the high voltage state VM to the low voltage state VL. The converter 100 performs the discharging operation and the electric energy of the capacitor 19 is also used to perform the power operation. The motor generator 12 does not perform the motor-assisted operation or the power generating operation. The actual voltage of the DC bus 110 is gradually decreased from the high voltage state VM in time t1 to the low voltage state VL in time t2.

During the period of time t2 to time t3 in which the upper turning body 3 is turned at the equal angular velocity, the turning motor 21 does not receive the supply of electric energy and does not generate regeneration energy. The target voltage and the actual voltage of the DC bus 110 are maintained in the low voltage state VL. The converter 100 does not perform the charge/discharge operation and the motor generator 12 does not perform the motor-assisted operation or the power generating operation. The DC bus 110 is maintained in the low voltage state VL and the charge/discharge control between the DC bus 110 and the capacitor 19 is not performed. Hence, it is possible to prevent the power loss.

During the period of time t3 to time t4, the turning motor 21 generates regeneration energy from the turning rotation of the upper turning body 3 (regeneration operation). The target voltage of the DC bus 110 is changed from the low voltage state VL to the high voltage state VM, and the regeneration energy is stored in the DC bus 110. The charge/discharge operation of the converter 100 and the motor-assisted operation or the power generating operation of the motor generator 12 are not performed. The actual voltage of the DC bus 110 is gradually increased from the low voltage state VL during the period of time t3 to time t4, but does not reach the high voltage state VM.

During the period of time t4 to time t5, the voltage of the DC bus 110 is recovered to the high voltage state VM. The target voltage of the DC bus 110 is maintained in the high voltage state VM, and the converter 100 performs the discharging operation until the target voltage value VM is reached.

As shown in the graph of "charging ratio (SOC)" of FIG. 14B, in the second embodiment, the voltage of the DC bus 110 is variably controlled and the SOC of the capacitor 19 can be maintained in the high state. During the period of time t2 to time t3, the power generating operation of the motor generator 12 is performed and the charging of the capacitor 19 is performed in order to recover the lowered voltage of the capacitor 19.

In the controlling method of the second embodiment, the energy of the power operation is partially supplied from the DC bus 110. Compared with the second comparative example in which all the energy of the power operation is fully supplied from the capacitor 19, the current which flows through the converter 100 can be reduced. Therefore, it is possible to prevent the power consumption.

The energy generated by the regeneration operation of the turning motor 21 during the period of time t3 to time t4 is stored in the DC bus 110, not in the capacitor 19. Therefore, it is possible to prevent the power consumption in the converter 100 during this period.

By the discharging operation of the converter 100 during the period of time t4 to time t5, the electric energy of the capacitor 19 is moved to the DC bus 110 and the voltage of the DC bus 110 is maintained in the high voltage state VM. For example, when it is needed to perform the turning operation again, the energy of the DC bus 110 can be used promptly according to the situation. The constant voltage (the high voltage state VM) in which the voltage of the DC bus 110 is maintained after time t5 is higher than the constant voltage in which the voltage of the capacitor 19 is maintained. In other words, after time t5, the power generating operation of the motor generator 12 is performed and the charging operation of the capacitor 19 is performed in order to recover the lowered voltage of the capacitor 19.

In the controlling methods of the first and second examples of the second embodiment, the collectable energy is predicted with the lowering of the boom 4 and the regeneration operation of the turning motor 21, at least the collectable energy is released and the lifting of the boom 4 and the power generating operation of the turning motor 21 are performed. Because the boom cylinder has the predetermined stroke, after the boom 4 is lifted, the lowering operation of the boom 4 must be performed in the amount equivalent to the lifting amount. Hence, the energy corresponding to the energy generated by the lowering operation of the boom 4 may be released. Similarly, after the upper turning body 3 is accelerated by the turning motor 21, the speed of the upper turning body 3 must be reduced to a stop. Hence, the energy corresponding to the energy generated by the decelerating operation of the upper turning body 3 may be released. When the charging ratio of the capacitor 19 during the period of time t1 to time t2 is smaller than the target charging ratio, the charging of the capacitor 19 is performed. Similarly, when the charging ratio of the capacitor 19 during the period of time t4 to time t5 is smaller than the target charging ratio, the charging of the capacitor 19 is performed.

As described in the foregoing, the first and second examples of the second embodiment of the present disclosure have been described. However, the present disclosure is not limited to these examples.

For example, in the above examples, the lifting or lowering of the boom 4 and the turning of the upper turning body 3 are performed at different times. Alternatively, when these operations are performed simultaneously, the regeneration energy generated by the boom 4 may be stored in the DC bus 110, and the regeneration energy generated by the upper turning body 3 may be stored in the capacitor 19, for example. If both the two types of regeneration energy are stored in the capacitor 19, the current flowing through the converter 100 will be increased and the energy loss will be increased. If the control is performed so that the regeneration energy from the boom 4 is stored in the DC bus 110, the energy loss in the converter 100 can be prevented.

In the foregoing embodiments, the hybrid excavator has been used. Alternatively, a crane may be used instead. In this case, lifting and lowering of the crane may be considered to be equivalent the lifting and lowering of the boom. The crane corresponds to the boom and the motor for lifting the crane is equivalent to the boom regeneration motor.

Figure 15:
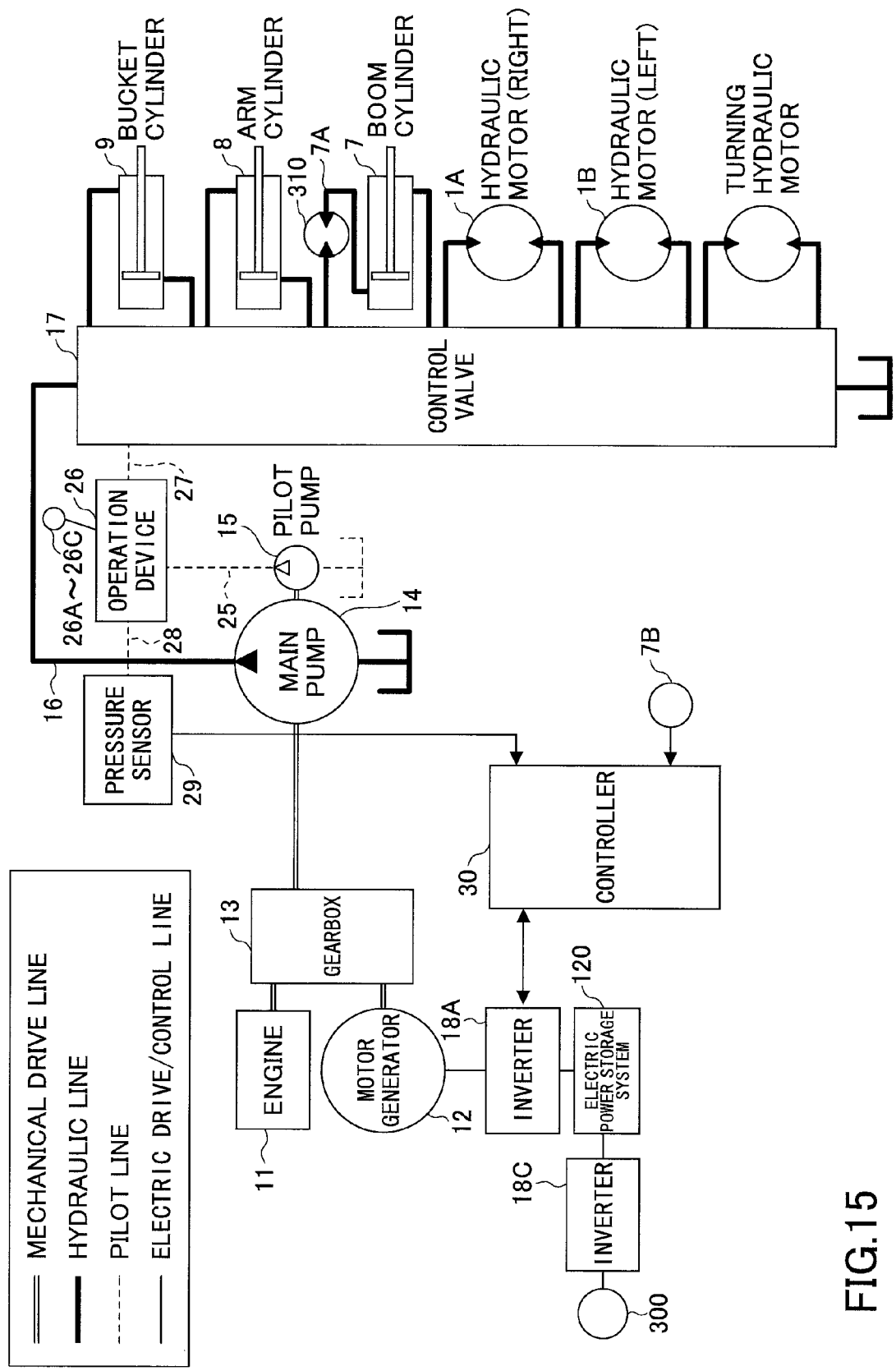
FIG. 15 is a block diagram showing the composition of a drive system of a hybrid excavator in which all the drive parts are hydraulically actuated.

In addition, the present disclosure is applicable to a hybrid excavator in which all the drive parts are hydraulically actuated as shown in FIG. 15. In the hybrid excavator shown in FIG. 15, electric power generated by the motor generator 12 using excessive power of the engine 11, and electric power generated by the boom regeneration motor 300 are stored in the electrical power storage system 120. The electric power stored in the electrical power storage system 120 is used to assist the output of the engine 11.

The present disclosure is not limited to the above-described embodiments, and variations and modifications may be made without departing from the scope of the present disclosure.

The present international application is based on and claims the benefit of priority of Japanese patent application No. 2009-137970, filed on Jun. 9, 2009, the contents of which are incorporated herein by reference in their entirety.

INDUSTRIAL APPLICABILITY

The present disclosure is applicable to a hybrid excavator in which an engine is assisted by an electric motor.

DESCRIPTION OF THE REFERENCE NUMERALS 1 lower running body
1A, 1B hydraulic motors
2 turning mechanism
3 upper turning body
4 boom
5 arm
6 bucket
7 boom cylinder
7A hydraulic piping
7B boom angle sensor
8 arm cylinder
9 bucket cylinder
10 cabin
11 engine
12 motor generator
13 gearbox
14 main pump
15 pilot pump
16 high voltage pressure hydraulic line
17 control valve
18, 18A, 18B, 20 inverters
19 capacitor
21 turning motor
22 resolver
23 mechanical brake
24 turning gearbox
25 pilot line
26 operation device
26A, 26B levers
26C pedal
26D button switch
27 pilot line
28 pilot line
29 pressure sensor
30 controller
35 display device
100 up-down voltage converter
101 reactor
102A voltage raising IGBT
102B voltage lowering IGBT
104 power supply connection terminal
105 inverter
106 output terminal
107 capacitor
110 DC bus
111 DC bus voltage detecting part
112 capacitor voltage detecting part
113 capacitor current detecting part
120 electrical power storage system
300 boom regeneration motor (dynamo)
310 boom regeneration hydraulic motor

The invention claimed is:

1. A hybrid excavator including a lower running body, an upper turning body which is turned on the lower running body, a boom having an end rotatably attached to the upper turning body, an arm having an end rotatably attached to the other end of the boom, and a work element rotatably attached to the other end of the arm,
   the hybrid excavator comprising:
   an engine disposed in the upper turning body to generate a driving force;
   a motor generator disposed in the upper turning body to perform an electric power generating operation by the driving force transmitted from the engine;
   a motor generator control unit disposed in the upper turning body to control operation of the motor generator in response to an externally supplied control signal;
   a first electrical power storage device disposed in the upper turning body and being capable of storing electricity;
   a second electrical power storage device disposed in the upper turning body, electrically connected to the motor generator control unit and being capable of storing electricity;
   a charge/discharge control unit disposed in the upper turning body to electrically connect the first electrical power storage device and the second electrical power storage device together and control a charge/discharge operation between the first electrical power storage device and the second electrical power storage device in response to the externally supplied control signal;
   a motor disposed in the upper turning body and electrically connected to the second electrical power storage device, the motor being capable of performing a regeneration operation to generate electric energy from mechanical energy and capable of storing the electric energy generated by the regeneration operation in the second electrical power storage device; and
   a control device disposed in the upper turning body to supply a control signal to at least one of the motor generator control unit and the charge/discharge control unit,
   wherein the control device is arranged to reduce an electrical power storage target value of at least one of the first electrical power storage device and the second electrical power storage device before the regeneration operation is performed by the motor.

2. The hybrid excavator according to claim 1, wherein, during a period in which the regeneration operation is performed by the motor, the control device sets the electrical power storage target value that is reduced by the control device before the regeneration operation is performed by the motor to a value larger than a previously set value before the regeneration operation is performed.

3. The hybrid excavator according to claim 1, wherein, during a period in which a motor-assisted operation is performed by the motor generator before the regeneration operation is performed by the motor, the control device sets the electrical power storage target value to a value smaller than a previously set value before the motor-assisted operation is performed.

4. The hybrid excavator according to claim 1, wherein, during a period in which a mechanical power generating operation is performed by the motor before the regeneration operation is performed by the motor, the control device sets the electrical power storage target value to a value smaller than a previously set value before the mechanical power generating operation is performed.

5. The hybrid excavator according to claim 1, wherein the motor is a boom regeneration motor and includes an angle detecting part to detect an angle of the boom, and
the control device comprises:
an estimated regeneration energy computing unit to compute an estimated regeneration energy based on the angle of the boom detected by the angle detecting part;
an electrical power storage target value determining unit to determine the electrical power storage target value based on the estimated regeneration energy computed by the estimated regeneration energy computing unit; and
an electrical power storage target value control unit to control at least one of the motor generator control unit and the charge/discharge control unit so that the electrical power storage target value determined by the electrical power storage target value determining unit is set up.

6. The hybrid excavator according to claim 5, wherein the estimated regeneration energy computing unit computes the estimated regeneration energy of the boom based on a potential energy of the boom.

7. The hybrid excavator according to claim 1, wherein the motor is a turning motor and includes a turning speed detecting part to detect a turning speed of the upper turning body, and
the control device comprises:
an estimated regeneration energy computing unit to compute an estimated regeneration energy based on the turning speed detected by the turning speed detecting part;
an electrical power storage target value determining unit to determine the electrical power storage target value based on the estimated regeneration energy computed by the estimated regeneration energy computing unit; and
an electrical power storage target value control unit to control at least one of the motor generator control unit and the charge/discharge control unit, so that the electrical power storage target value determined by the electrical power storage target value determining unit is set up.

8. The hybrid excavator according to claim 7, wherein the estimated regeneration energy computing unit computes the estimated regeneration energy of the upper turning body based on a kinetic energy of the upper turning body.

9. The hybrid excavator according to claim 7, wherein a lifting magnet is provided in the work element, and the estimated regeneration energy computing unit sets the estimated regeneration energy of the lifting magnet to a fixed value when the lifting magnet is in operation.

10. The hybrid excavator according to claim 1, wherein the control device sets a charging ratio of the first electrical power storage device before it is estimated that the regeneration operation will be performed by the motor to 95% or larger.

11. The hybrid excavator according to claim 1,
wherein the control device sets a voltage of the second electrical power storage device before it is estimated that regeneration operation is performed by the motor, to a voltage value larger than a voltage of the first electrical power storage device.

12. A method of controlling a hybrid excavator including:
an engine to generate a driving force;
a motor generator to perform an electric power generating operation by the driving force transmitted from the engine;
a motor generator control unit to control operation of the motor generator in response to an externally supplied control signal;
a first electrical power storage device capable of storing electricity;
a second electrical power storage device electrically connected to the motor generator control unit and being capable of storing electricity;
a charge/discharge control unit electrically connecting the first electrical power storage device and the second electrical power storage device together and controlling a charge/discharge operation between the first electrical power storage device and the second electrical power storage device in response to an externally supplied control signal;
a motor electrically connected to the second electrical power storage device, the motor being capable of performing a regeneration operation to generate electric energy from mechanical energy and capable of storing the electric energy generated by the regeneration operation in the second electrical power storage device; and
a control device to supply a control signal to at least one of the motor generator control unit and the charge/discharge control unit;
the method of controlling the hybrid excavator comprising:
reducing an electrical power storage target value of at least one of the first electrical power storage device and the second electrical power storage device before the regeneration operation is performed by the motor.

* * * * *